US009411593B2

(12) United States Patent
Jha

(10) Patent No.: US 9,411,593 B2
(45) Date of Patent: Aug. 9, 2016

(54) PROCESSORS, METHODS, SYSTEMS, AND INSTRUCTIONS TO CONSOLIDATE UNMASKED ELEMENTS OF OPERATION MASKS

(71) Applicant: Intel Corporation, Santa Clara, CA (US)

(72) Inventor: Ashish Jha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 13/842,730

(22) Filed: Mar. 15, 2013

(65) Prior Publication Data

US 2014/0281396 A1   Sep. 18, 2014

(51) Int. Cl.
| G06F 7/38 | (2006.01) |
| G06F 9/00 | (2006.01) |
| G06F 9/44 | (2006.01) |
| G06F 9/30 | (2006.01) |

(52) U.S. Cl.
CPC ........ *G06F 9/30145* (2013.01); *G06F 9/30018* (2013.01); *G06F 9/30036* (2013.01)

(58) Field of Classification Search
CPC .................................................. G06F 9/30145
USPC .......................................................... 712/224
See application file for complete search history.

(56) References Cited

U.S. PATENT DOCUMENTS

| 5,487,159 | A | 1/1996 | Byers et al. | |
| 6,697,427 | B1 * | 2/2004 | Kurak, Jr. ............ | H04N 19/547 375/240.03 |
| 6,735,690 | B1 * | 5/2004 | Barry .................. | G06F 9/30054 710/267 |
| 7,003,450 | B2 * | 2/2006 | Sadri ...................... | G10L 19/00 704/201 |
| 7,685,408 | B2 * | 3/2010 | Wolff .................. | G06F 9/30018 712/224 |

(Continued)

FOREIGN PATENT DOCUMENTS

| CN | 1926511 A | 3/2007 |
| JP | 59-165147 A | 11/1984 |
| JP | 60-072071 A | 4/1985 |

(Continued)

OTHER PUBLICATIONS

Combined Search Report received for United Kingdom Patent Application No. 1404692.4, mailed on Oct. 15, 2014, 6 pages.

(Continued)

*Primary Examiner* — Chun-Kuan Lee
(74) *Attorney, Agent, or Firm* — Vecchia Patent Agent, LLC

(57) ABSTRACT

An instruction processing apparatus of an aspect includes a plurality of operation mask registers. The apparatus also includes a decode unit to receive an operation mask consolidation instruction. The operation mask consolidation instruction is to indicate a source operation mask register, of the plurality of operation mask registers, and a destination storage location. The source operation mask register is to include a source operation mask that is to include a plurality of masked elements that are to be disposed within a plurality of unmasked elements. An execution unit is coupled with the decode unit. The execution unit, in response to the operation mask consolidation instruction, is to store a consolidated operation mask in the destination storage location. The consolidated operation mask is to include the unmasked elements from the source operation mask consolidated together. Other apparatus, methods, systems, and instructions are also disclosed.

26 Claims, 19 Drawing Sheets

(56) References Cited

U.S. PATENT DOCUMENTS

2009/0019269 A1  1/2009  Wolff et al.
2010/0042789 A1  2/2010  Gonion et al.

FOREIGN PATENT DOCUMENTS

JP   2009-086870 A    4/2009
WO   2013/095604 A1   6/2013

OTHER PUBLICATIONS

Office Action received for Japanese Patent Application No. 2014-034924, mailed on Dec. 16, 2014, 6 pages of English Translation and 6 pages of Japanese Office Action.

Office Action received for Japanese Patent Application No. 2014-034924, mailed on Apr. 7, 2015, 2 pages of English Translation and 1 pages of Japanese Office Action.

Office Action received for Korean Patent Application No. 10-2014-0030864, mailed on Sep. 8, 2015, 2 pages of English Translation and 3 pages of Korean Office Action.

Office Action received for Japanese Patent Application No. 2014-034924, mailed on Sep. 15, 2015, 3 pages of English Translation and 3 pages of Japanese Office Action.

Combined Search and Examination Report received for United Kingdom Patent Application No. 1512362.3, mailed on Nov. 3, 2015, 5 pages.

Office Action received for Chinese Patent Application No. 201410094949.2, mailed on Apr. 6, 2016, 15 pages of Chinese Office Action only.

* cited by examiner

FIG. 5

METHOD WITHIN
A PROCESSOR
530

RECEIVE OPERATION MASK CONSOLIDATION INSTRUCTION INDICATING SOURCE OPERATION MASK AND DESTINATION STORAGE LOCATION, SOURCE OPERATION MASK INCLUDING MASKED ELEMENTS DISPOSED WITHIN UNMASKED ELEMENTS — 531

STORE CONSOLIDATED OPERATION MASK IN DESTINATION STORAGE LOCATION IN RESPONSE TO OPERATION MASK CONSOLIDATION INSTRUCTION, CONSOLIDATED OPERATION MASK INCLUDING UNMASKED ELEMENTS FROM SOURCE OPERATION MASK CONSOLIDATED TOGETHER — 532

NUMBER OF PACKED DATA
OPERATION MASK BITS
840

| DATA ELEMENT WIDTH | PACKED DATA WIDTH | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS / SP | 4 | 8 | 16 |
| 64-BIT QWORDS / DP | 2 | 4 | 8 |

REGISTER ARCHITECTURE 1200
FIG. 12
General Purpose Registers 1225
16 X 64 BITS
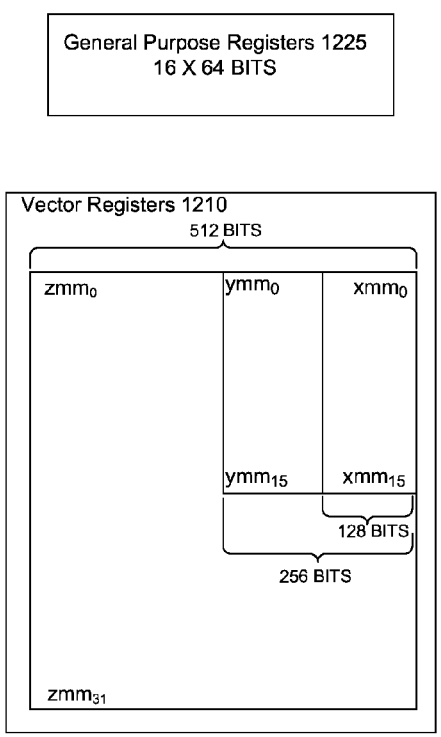
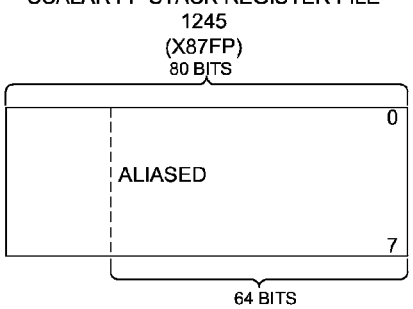
SCALAR FP STACK REGISTER FILE
1245
(X87FP)
80 BITS
64 BITS
MMX PACKED INT FLAT
REGISTER FILE 1250
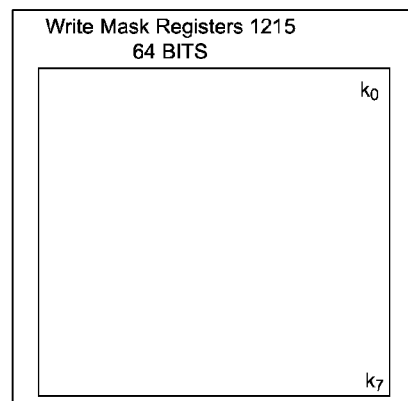

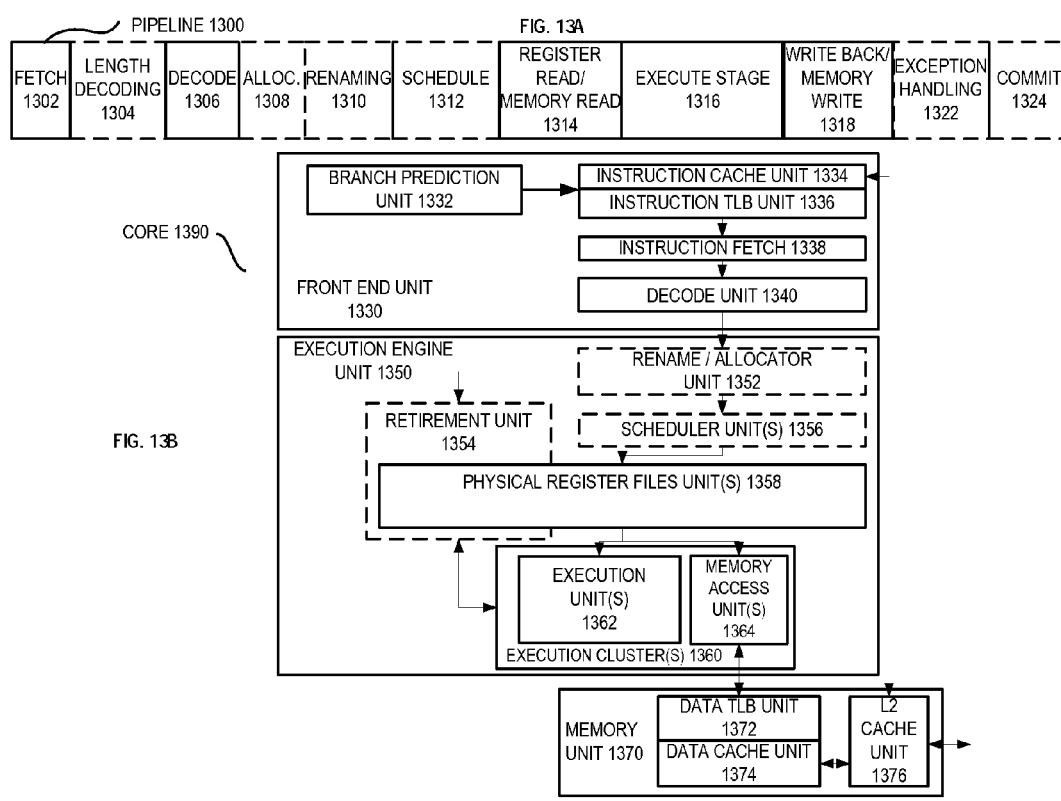

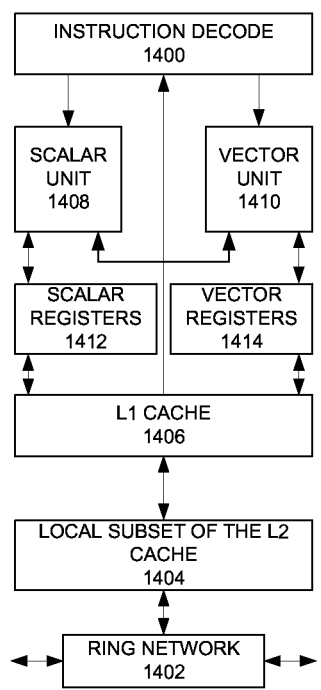
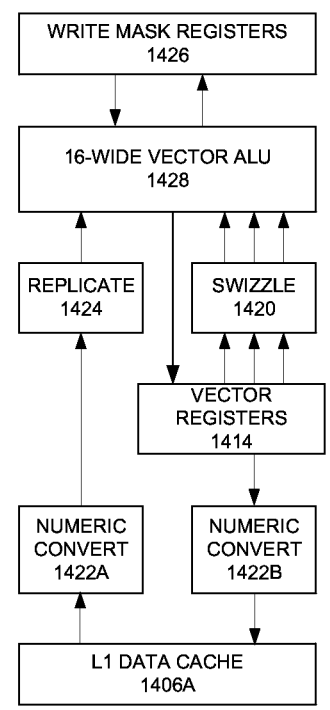

PROCESSORS, METHODS, SYSTEMS, AND INSTRUCTIONS TO CONSOLIDATE UNMASKED ELEMENTS OF OPERATION MASKS

BACKGROUND

1. Technical Field

Embodiments described herein generally relate to processors. In particular, embodiments described herein generally relate to processors to manipulate operation masks in response to instructions.

2. Background Information

Many processors have Single Instruction, Multiple Data (SIMD) architectures. In SIMD architectures, instead of a scalar instruction operating on only one data element or pair of data elements, a packed data instruction, vector instruction, or SIMD instruction may operate on multiple data elements, or multiple pairs of data elements, simultaneously and/or in parallel. For example, multiple data elements may be packed within one register or memory location as packed data or vector data. In packed data, the bits of the register or other storage location may be logically divided into a sequence of multiple generally fixed-sized data elements. Each of the data elements may represent an individual piece of data that is stored along with other data elements often having the same size. For example, a 256-bit packed data register may have four 64-bit data elements, eight 32-bit data elements, sixteen 16-bit data elements, or thirty-two 8-bit data elements. Each of the packed data elements may represent a separate individual piece of data (e.g., a color of a pixel, a floating point value, etc.) that may be operated on separately or independently of the others. The processor may have parallel execution hardware responsive to the packed or SIMD instruction to perform the multiple operations simultaneously or in parallel. Such SIMD architectures generally help to significantly improve processing speed.

BRIEF DESCRIPTION OF THE DRAWINGS

The invention may best be understood by referring to the following description and accompanying drawings that are used to illustrate embodiments. In the drawings:

FIG. 5 is a block flow diagram of an embodiment of a method of processing an embodiment of an operation mask consolidation instruction.

FIG. 12 is a block diagram of a register architecture according to one embodiment of the invention.

FIG. 13A is a block diagram illustrating both an exemplary in-order pipeline and an exemplary register renaming, out-of-order issue/execution pipeline according to embodiments of the invention.

FIG. 13B is a block diagram illustrating both an exemplary embodiment of an in-order architecture core and an exemplary register renaming, out-of-order issue/execution architecture core to be included in a processor according to embodiments of the invention.

FIG. 14A is a block diagram of a single processor core, along with its connection to the on-die interconnect network and with its local subset of the Level 2 (L2) cache, according to embodiments of the invention.

FIG. 14B is an expanded view of part of the processor core in FIG. 14A according to embodiments of the invention.

DETAILED DESCRIPTION OF EMBODIMENTS

Disclosed herein are operation mask consolidation instructions, processors to execute the instructions, methods performed by the processors when processing or executing the instructions, and electronic systems incorporating one or more processors to process or execute the instructions. In the following description, numerous specific details are set forth (e.g., specific instruction operations, operation masks, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
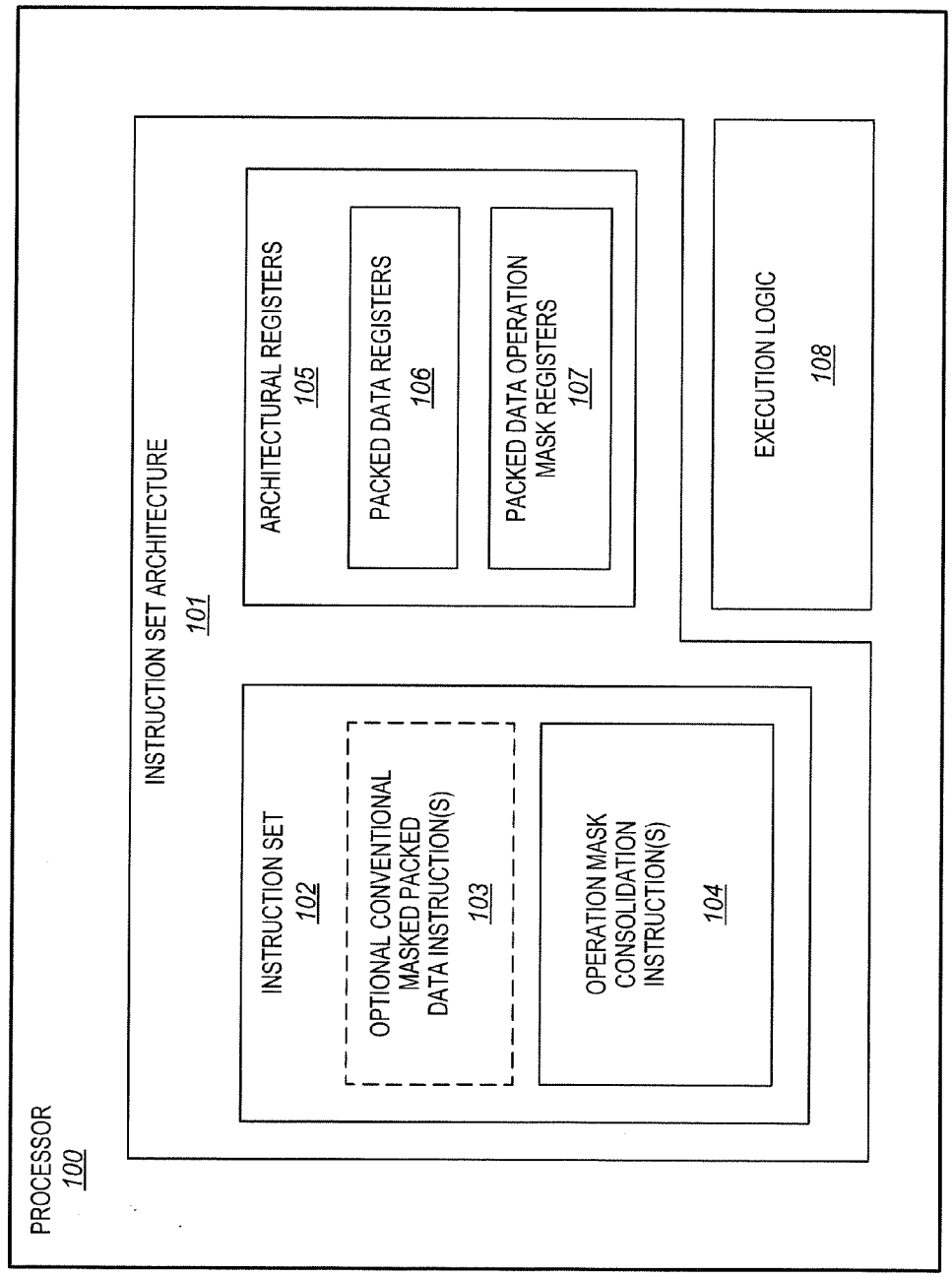
FIG. 1 is a block diagram of an embodiment of a processor that is operable to process one or more embodiments of operation mask consolidation instructions.

FIG. 1 is a block diagram of an example embodiment of a processor 100 to process one or more operation mask consolidation instructions 104. In some embodiments, the processor may be a general-purpose processor (e.g., of the type used in desktop, laptop, servers, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers, to name just a few examples. The processor may be any of various complex instruction set computing (CISC) processors, various reduced instruction set computing (RISC) processors, various very long instruction word (VLIW) processors, various hybrids thereof, or other types of processors entirely.

The processor has an instruction set architecture (ISA) 101. The ISA represents a part of the architecture of the processor related to programming and commonly includes the native instructions, architectural registers, data types, addressing modes, memory architecture, and the like, of the processor. The ISA is distinguished from the microarchitecture, which generally represents the particular processor design techniques selected to implement the ISA.

The ISA includes architecturally-visible registers (e.g., an architectural register file) 105. The architectural registers may also be referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by instructions, reorder buffers, retirement registers, etc.). The registers generally represent on-die processor storage locations. The illustrated architectural registers include packed data registers 106. Each of the packed data registers may be operable to store packed or vector data. The illustrated architectural registers also include packed data operation mask registers 107. Each of the packed data operation mask registers may be operable to store a packed data operation mask.

The ISA includes an instruction set 102. The instructions of the instruction set represent macroinstructions, assembly language instructions, or machine-level instructions provided to the processor for execution, as opposed to microinstructions, micro-ops, or those which result from decoding macroinstructions. The instruction set optionally includes one or more conventional masked packed data instructions 103. Similarly to the packed data instructions mentioned previously, each of the masked packed data instructions 103 may be operable to cause or result in the processor performing a packed data operation on data elements of one or more packed data operands. The packed data operands may be stored in the packed data registers 107. However, each of the masked packed data instructions is different in that it may indicate one or more packed data operation masks (e.g., in the packed data operation mask registers 107), which mask, predicate, or conditionally control the packed data processing. The packed data operation masks may represent operation masks, predicate operands, or conditional operation control operands.

The instruction set also includes one or more operation mask consolidation instructions 104. The operation mask consolidation instructions may cause the processor to generate and store consolidated operation masks. Specific examples of suitable instructions/operations will be discussed further below.

The processor also includes execution logic 108. The execution logic is operable to execute or process the one or more operation mask consolidation instructions 104. In some embodiments, the execution logic may include particular logic (e.g., particular circuitry or hardware potentially combined with firmware) to execute these instructions.

Figure 2A:
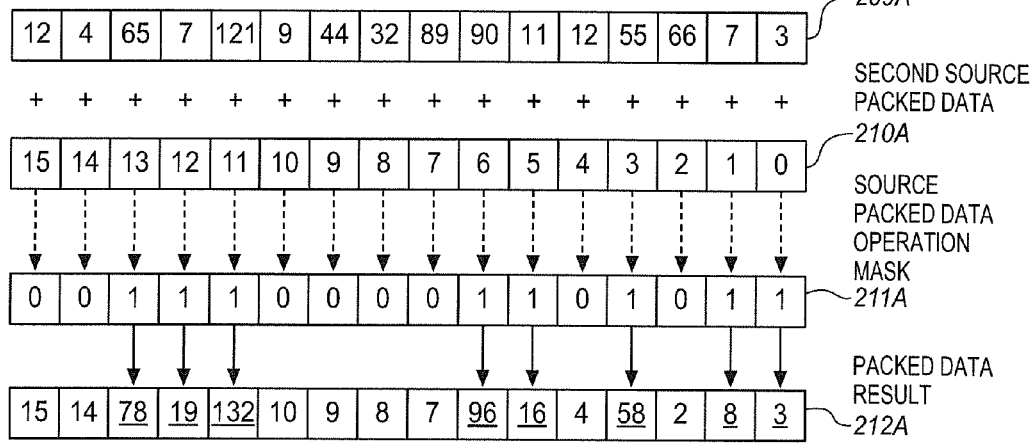
FIG. 2A is a block diagram of an example embodiment of a merging masked packed data operation.

Before discussing the operation mask consolidation instructions 104 further, it may be helpful to first discuss a few examples of how packed data operation masks may be used. FIG. 2A is a block diagram of a first example of a masked packed data operation with merging 203A. The masked packed data operation may be performed in response to, or as a result of, a masked packed data instruction (e.g., the masked packed data instruction 103 of FIG. 1).

The masked packed data instruction may indicate a first source packed data 209A and a second source packed data 210A. Other masked packed data instructions (e.g., a packed shift instruction) may indicate only a single source packed data, or more than two source packed data. In the illustration, the first and second source packed data are of the same size, contain data elements of the same width, and thus each contain the same number of data elements, although this is not required. In the illustration, each of the first and second source packed data have sixteen data elements. As one example, the first and second source packed data may each be 512-bits wide and may each include sixteen 32-bit doubleword data elements, although this is not required. The source data elements in the same relative positions in the two source packed data (e.g., in the same vertical positions) represent pairs of corresponding data elements. Each of the data elements has a numerical value shown within the block representing the data element. For example, the lowest order data element (on the right) of the first source packed data has a value of 3, the next-to-lowest order data element of the first source packed data has a value of 7, and so on.

The instruction also indicates a source packed data operation mask 211A. The operation mask represents a predicate operand or conditional vector operation control operand to predicate or conditionally control a packed or vector operation. The packed data operation mask includes mask elements, predicate elements, or conditional control elements. The packed data operation masks may be operable to mask or conditionally control packed data processing at per-data element granularity. The mask elements may be included in a one-to-one correspondence with one or more corresponding source data elements. For example, as shown in the illustration, there may be one such mask element for each pair of corresponding source data elements. The operation masks may allow packed data processing of each data element, or pair of corresponding data elements, to be predicated or conditionally controlled separately and independently of the others. Each mask element may be operable to mask or not mask a packed data operation on the one or more corresponding source packed data elements. For example, in this example, each mask element may mask an operation on a pair of corresponding source packed data elements.

As shown in the illustration, commonly each mask element may be a single bit. A single bit may allow specifying either of two different possibilities (e.g., perform the operation versus do not perform the operation, store a result of the operation versus do not store a result of the operation, etc.). Alternatively, if selecting between more than two different options is desired, then two or more bits may be used for each mask element. In the illustration, the packed data operation mask includes sixteen bits (i.e., 0011100001101011), and each of the sixteen bits has an ordered correspondence to one of the sixteen pairs of corresponding data elements of the first and second source packed data. For example, the lowest-order mask bit (on the right) corresponds to the lowest order pair of corresponding data elements, the highest-order mask bit (on the left) corresponds to the highest order pair of corresponding data elements, and so on.

The illustrated masked packed data operation is a masked packed data addition operation to conditionally store sums of corresponding pairs of data elements from the first and second source packed data in a packed data result 212A according to the masking, predication, or conditional control from the source packed data operation mask. Each of the sixteen mask bits of the packed data operation mask 211A is either set (i.e., has a binary value of 1) or is cleared (i.e., has a binary value of 0). According to the illustrated convention, each mask bit is set (i.e., 1) or cleared (i.e., 0), respectively, to allow or not allow a result of the packed data operation (in this case addition), performed on a corresponding pair of source packed data elements, to be stored in a corresponding data element of the packed data result 212A. These set bits (i.e., 1) represent unmasked bits or unmasked elements, whereas these cleared bits (i.e., 0) represent masked bits or masked elements. For example, the next-to-lowest-order mask bit is set (i.e., 1) and the sum (i.e., 8=7+1) is stored in the corresponding next-to-lowest-order data element of the packed data result. In the illustration, the sums are underlined.

Conversely, when the given mask bit is cleared (i.e., 0), then a result of the packed data operation on the corresponding pair of source data elements is not stored in the corresponding result data element. Rather, in the illustration, the value of the corresponding data element from the second source packed data is stored in the corresponding result data element. For example, the highest-order bit (on the left) in the packed data operation mask is cleared (i.e., 0), and the numerical value (i.e., 15) of the highest-order data element from the second source packed data is stored in the highest-order result data element. This version of masking is referred to as merging-masking. It is to be appreciated that an opposite convention is also possible where bits are cleared (i.e., 0) to allow the results to be stored, or set (i.e., 1) to not allow the results to be stored.

In some embodiments, the packed data operation may optionally be performed on all corresponding pairs of data elements of the first and second source packed data regardless of whether the corresponding mask bits are set or cleared, but the results of the packed data operation may or may not be stored in the packed data result depending upon the values of the mask bits. Alternatively, in another embodiment, the packed data operation may optionally be omitted (i.e., not performed) if the corresponding mask bit specifies that the result of the operation is not to be stored. In some embodiments, exceptions (e.g., exception flags) or violations may optionally be suppressed or not raised by a packed data operation on a masked-off element. In some embodiments, for masked packed data instructions with a memory operand, memory faults may optionally be suppressed for masked-off data elements.

Figure 2B:
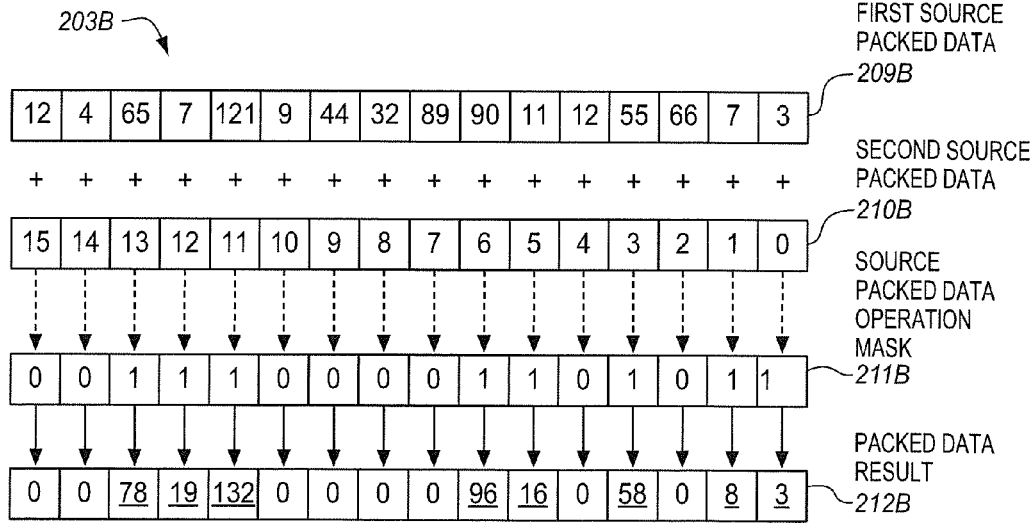
FIG. 2B is a block diagram of an example embodiment of a zeroing masked packed data operation.

FIG. 2B is a block diagram illustrating a second representative example embodiment of a masked packed data operation with zeroing 203B. The masked packed data operation with zeroing is similar to the aforementioned masked packed data operation with merging. To avoid obscuring the description, the similarities will not be repeated, but rather, the differences will primarily be mentioned. One notable difference is that, instead of merging or storing values of data elements of a source packed data (e.g., the second source packed data 210A in FIG. 2A) into the corresponding result data elements when the corresponding mask bits are masked off (e.g., cleared to 0), the corresponding result data elements are zeroed out. For example, all 32-bits of a doubleword result packed data element may have a value of zero. This is referred to as zeroing-masking. Alternatively, other predetermined values besides zero may optionally be used.

These are just a few illustrative examples of masked packed data operations. It is to be appreciated that a processor may support a wide variety of different types of masked packed data operations. In other embodiments, these may include those that have only one source packed data, more than two source packed data, source packed data of different sizes, source packed data of different numbers of data elements, operations performed in a horizontal or non-vertically aligned fashion, etc.

Figure 3:
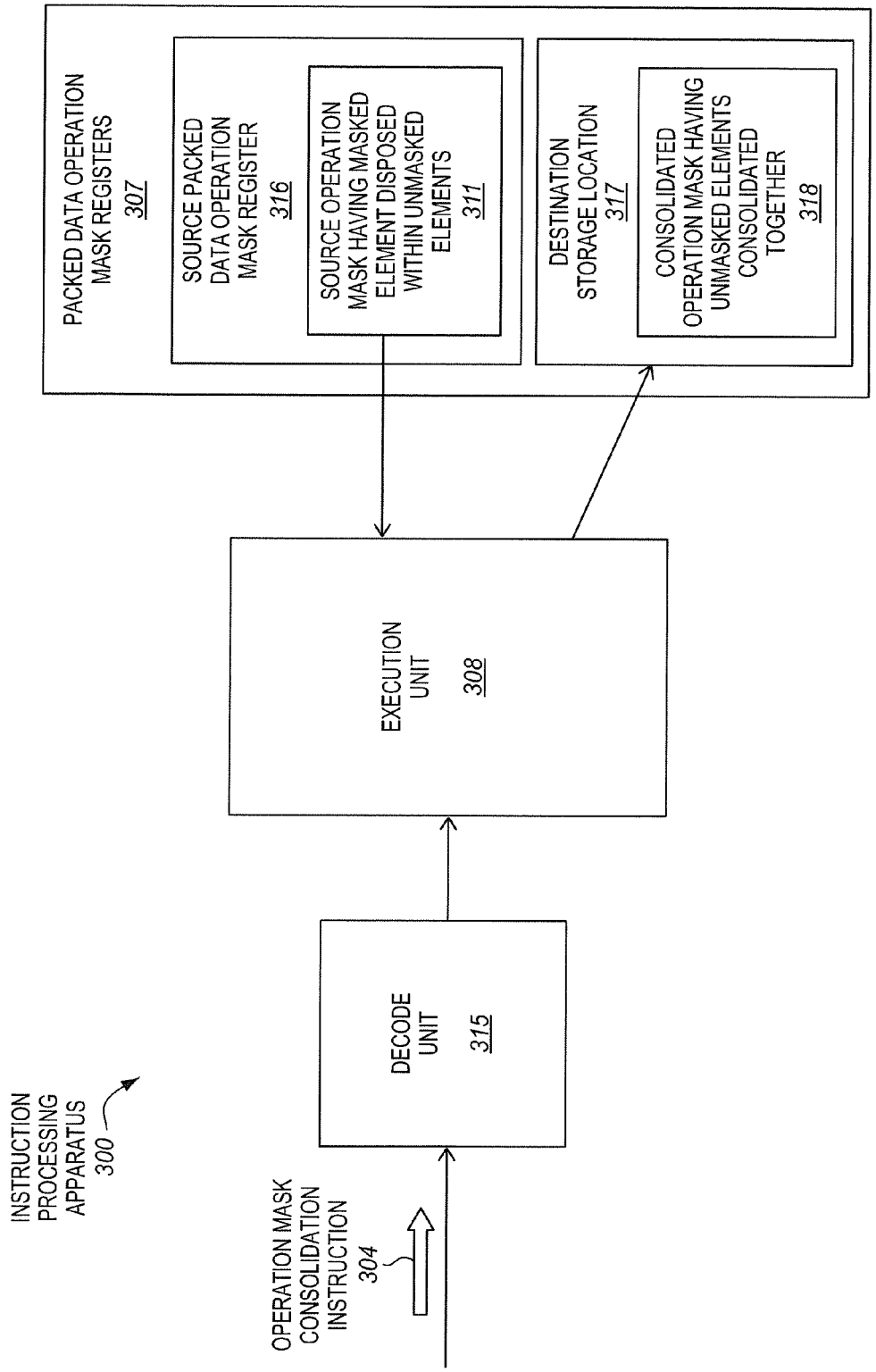
FIG. 3 is a block diagram of an embodiment of an instruction processing apparatus that is operable to execute one or more embodiments of operation mask consolidation instructions.

FIG. 3 is a block diagram of an embodiment of an instruction processing apparatus 300 having an execution unit 308 that is operable to execute an embodiment of an operation mask consolidation instruction 304. In some embodiments, the instruction processing apparatus may be a processor and/or may be included in a processor. For example, in some embodiments, the instruction processing apparatus may be, or may be included in, the processor of FIG. 1. Alternatively, the instruction processing apparatus may be included in a similar or different processor. Moreover, the processor of FIG. 1 may include either a similar or different instruction processing apparatus.

The apparatus 300 may receive the operation mask consolidation instruction 304. For example, the instruction may be received from an instruction fetch unit, an instruction queue, or the like. The operation mask consolidation instruction may represent a machine code instruction, assembly language instruction, macroinstruction, or control signal of an ISA of the apparatus. The operation mask consolidation instruction 304 may explicitly specify (e.g., through one or more fields or a set of bits), or otherwise indicate (e.g., implicitly indicate), a source operation mask 311, and may specify or otherwise indicate a destination storage location 318. In some embodiments, the instruction may explicitly specify both the source operation mask and the destination storage location, although this is not required. For example, an operation mask consolidation instruction of one embodiment may have the instruction format KConsol K1, K2 where KConsol indicates the opcode, K1 specifies a destination packed data operation mask register, K2 specifies a source packed data operation mask register. In some embodiments, the source operation mask 311 may include masked elements (e.g., mask bits cleared to zero), and unmasked elements (e.g., mask bits set to one), and at least some of the masked elements may be interspersed or otherwise disposed within at least some of the unmasked elements. Examples of this include, but are certainly not limited to, 01010101, 00101000, 11100111, 01100101, and 11000011, to give just a few illustrative examples.

In some embodiments, the source operation mask 311 may be stored in a source packed data operation mask register 316 that may be specified or otherwise indicated by the instruction. The packed data operation mask register 316 may be one of a set of packed data operation mask registers 307. Similarly, in some embodiments, the destination storage location 317 may be among the packed data operation mask registers 307. In some embodiments, the destination storage location may be either the same, or a different register, as the source packed data operation mask 316. The packed data operation mask registers may be implemented in different ways in different microarchitectures using well known techniques and are not limited to any known particular type of circuit. Examples of suitable types of registers include, but are not limited to, dedicated physical registers, dynamically allocated physical registers using register renaming, and combinations thereof.

The illustrated instruction processing apparatus includes a decode unit or decoder 315. The instruction decoder may receive and decode macroinstructions, machine code instructions, assembly language instructions, or other relatively higher-level instructions, and output one or more microinstructions, micro-operations, micro-code entry points, or other relatively lower-level instructions or control signals that reflect, represent, and/or are derived from the received higher-level instructions. The one or more lower-level instructions or control signals may implement the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction and emulate, translate, morph, interpret, or otherwise convert the instruction into one or more corresponding derived instructions or control signals. In other embodiments, both instruction conversion logic and a decoder may be used. For example, the apparatus may have instruction conversion logic to convert a received machine code instruction into one or more intermediate instructions, and a decoder to decode the one or more intermediate instructions into one or more lower-level instructions or control signals executable by native hardware of the apparatus (e.g., an execution unit). Some or all of the instruction conversion logic may be located outside the instruction processing apparatus, such as, for example, on a separate die and/or in a memory.

Referring again to FIG. 3, the execution unit 308 is coupled with the decode unit 315, with the source packed data operation mask 311, and with the destination storage location 317. The execution unit may receive one or more decoded or otherwise converted instructions or control signals that represent and/or are derived from the operation mask consolidation instruction 304. As previously mentioned, the source operation mask 311 may include masked elements, and unmasked elements, and at least some of the masked elements may be interspersed or otherwise disposed within at least some of the unmasked elements. In some embodiments, the execution unit may be operable in response to and/or as a result of the operation mask consolidation instruction 304 to store a consolidated operation mask 318 in the destination storage location 317. In some embodiments, the consolidated operation mask may include the unmasked elements from the source operation mask collected together, brought together, made adjacent to one another, or otherwise consolidated together. In some embodiments, in the consolidated operation mask there may be no masked elements disposed or interspersed between the consolidated set of all of the unmasked elements from the source operation mask. That is, the masked elements may be moved away or otherwise eliminated from being between the unmasked elements.

In some embodiments, each of the masked and unmasked elements may be a different single mask bit, such as, for example, each masked element may be a single bit having a value of binary zero (i.e., be cleared to 0) whereas each unmasked element may be a single bit having a value of binary one (i.e., be set to 1). In some embodiments, the execution unit may be operable to consolidate together the unmasked elements from the source operation mask in a least significant portion of the consolidated operation mask or register. Alternatively, in some embodiments, the execution unit may be operable to consolidate together the unmasked elements from the source operation mask in a most significant portion of the consolidated operation mask or register. In some embodiments, the operation mask consolidation instruction may be operable to indicate whether the unmasked elements from the source operation mask are to be consolidated in a least significant or most significant portion of the consolidated operation mask or register. For example, in some embodiments, the operation mask consolidation instruction may include one or more bits that may have a first value (a single bit binary value of zero) to indicate that the unmasked elements are to be consolidated together in the significant portion, or a second value (a single bit binary value of one) to indicate that the unmasked elements are to be consolidated together in the most significant portion. For example, an operation mask consolidation instruction of one embodiment may have the instruction format KConsol K1, K2, order, where KConsol indicates the opcode, K1 specifies a destination packed data operation mask register, K2 specifies a source packed data operation mask register, and order includes one or more bits to indicate whether consolidation is to the least or most significant bit in the operation mask.

The execution unit and/or the instruction processing apparatus may include specific or particular logic (e.g., circuitry or other hardware potentially combined with firmware and/or software) that is operable to execute the operation mask consolidation instruction and store the consolidated operation mask in response to the operation mask consolidation instruction (e.g., in response to one or more instructions or control signals decoded or otherwise derived from the operation mask consolidation instruction). By way of example, the execution unit may include a logical unit, an arithmetic logic unit, a digital circuit to perform logical operations, an execution or functional unit including operation mask consolidation logic, or the like.

To avoid obscuring the description, a relatively simple instruction processing apparatus 300 has been shown and described. In other embodiments, the apparatus may optionally include other well-known components found in processors. Examples of such components include, but are not limited to, a branch prediction unit, an instruction fetch unit, instruction and data caches, instruction and data translation lookaside buffers, prefetch buffers, microinstruction queues, microinstruction sequencers, a register renaming unit, an instruction scheduling unit, bus interface units, second or higher level caches, a retirement unit, other components included in processors, and various combinations thereof. There are literally numerous different combinations and configurations of components in processors, and embodiments are not limited to any particular combination or configuration. Embodiments may be included in processors have multiple cores, logical processors, or execution engines at least one of which has execution logic operable to execute an embodiment of an instruction disclosed herein.

Figure 4A:
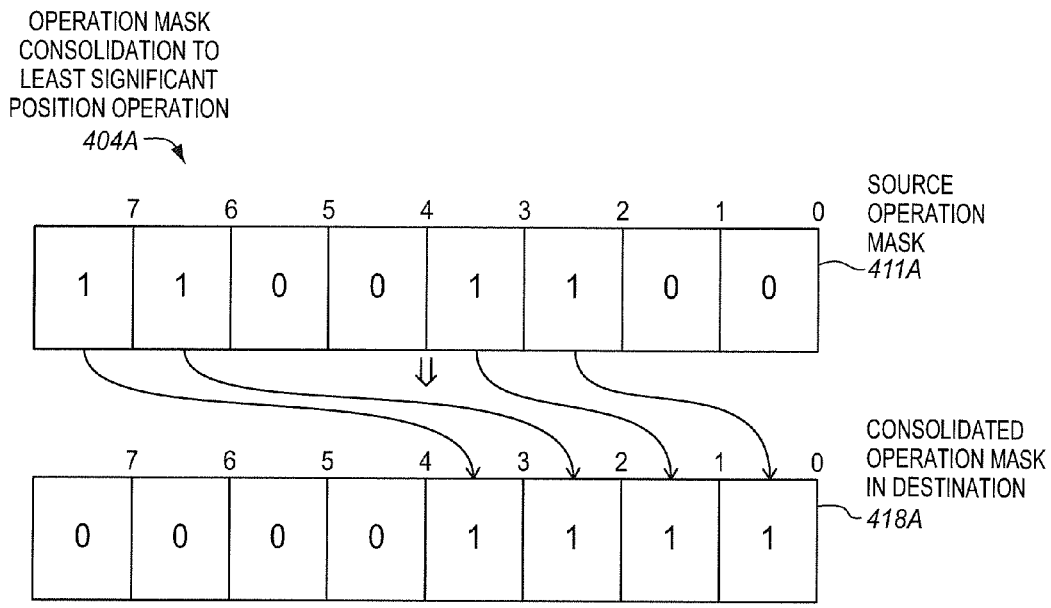
FIG. 4A is a block diagram of a first example embodiment of an operation mask consolidation operation that may be performed in response to and/or as a result of a first example embodiment of an operation mask consolidation instruction.

FIG. 4A is a block diagram of an example embodiment of an operation mask consolidation to least significant position operation 404A that may be performed in response to and/or as a result of an example embodiment of an operation mask consolidation to least significant position instruction. The instruction may explicitly specify or otherwise indicate (e.g., implicitly indicate) a source operation mask 411A and a destination (e.g., a destination storage location). In the illustrated embodiment, the source operation mask is 8-bits wide. In other embodiments, the source operation mask may be either narrower (e.g., 4-bits) or wider (e.g., 16-bits, 32-bits, 64-bits, or even wider). In some aspects, the width of the operation mask may depend upon a corresponding packed data width and data element width (see e.g., the discussion of FIGS. 8 and 10). In some embodiments, the source operation mask may be included in an operation mask register, and may represent a subset of the bits of the register (e.g., a lowest order subset) that are active, meaningful and/or used for predication. In contrast, another subset of the bits in the register (e.g., a highest order remaining portion) may be non-active, non-meaningful, and/or not used for predication. In some embodiments, the source operation mask may include a plurality of masked elements disposed within a plurality of unmasked elements. For example, in the illustration, the source operation mask includes, from lowest order bit-0 (on the right) to highest order bit-7 (on the left), the bit values 0, 0, 1, 1, 0, 0, 1, 1. This data is only one example, and the instruction/operation works regardless of the arrangement of the masked and unmasked elements in the source operation mask. Virtually any other of numerous possible arrangements will also work. According to the illustrated convention, the set or "1" bit values represent unmasked bits, whereas the cleared or "0" bit values represent masked bits. In an alternate embodiment, the opposite convention may be used instead. Moreover, in other embodiments, multi-bit mask elements may optionally be used (e.g., having two bits, or a width of corresponding packed data elements).

An embodiment of a consolidated operation mask 418A may be stored in the destination in response to and/or as a result of the instruction. In some embodiments, the consolidated operation mask may include the unmasked elements (e.g., the set bits or "1" bit values according to the illustrated convention) from the source operation mask 411A collected or otherwise consolidated together in the destination. For example, in this least significant position version of the instruction/operation, all unmasked elements (e.g., the set or "1" bit values according to the illustrated convention), in this case all four, are stored in the lowest order bits of the consolidated operation mask and/or destination, in this case the lowest order 4-bits. In particular, the consolidated operation mask includes, from lowest order bit-0 (on the right) to highest order bit-7 (on the left), the bit values 1, 1, 1, 1, 0, 0, 0, 0. Various ways are contemplated to achieve this including though routing, copying, selecting, or some combination thereof, or otherwise moving or rearranging these unmasked elements. In some embodiments, the masked elements (e.g., the cleared bits or "0" bit values according to the illustrated convention) from the source operation mask may be merely discarded or deleted and may not need to be conveyed to the destination. Bits more significant than the total number of unmasked bits in the source operation mask may merely be zeroed out in the destination. That is, any discarded masked elements (e.g., the cleared bits or "0" bit values) may be filled in with replacement masked elements (e.g., cleared bits or "0" bit values). Alternatively, in other embodiments, the masked elements from the source operation mask may be moved or rearranged to the positions higher order than the unmasked elements.

Figure 4B:
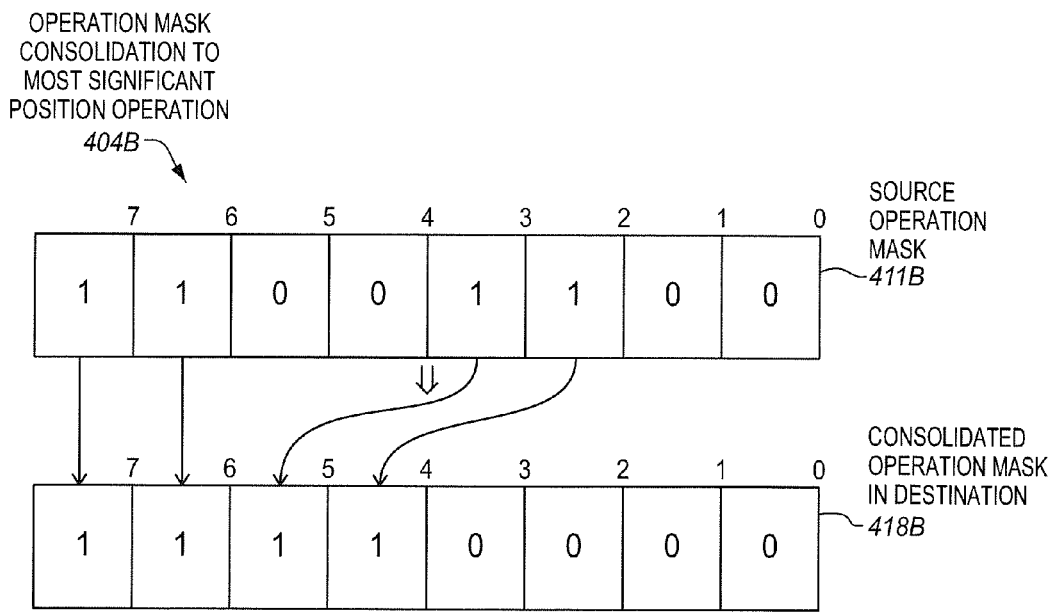
FIG. 4B is a block diagram of a second example embodiment of an operation mask consolidation operation that may be performed in response to and/or as a result of a second example embodiment of an operation mask consolidation instruction.

FIG. 4B is a block diagram of an example embodiment of an operation mask consolidation to most significant position operation 404B that may be performed in response to and/or as a result of an example embodiment of an operation mask consolidation to most significant position instruction. Many of the features and characteristics are similar to or the same as those previously described for FIG. 4A. To avoid obscuring the description, the discussion will emphasize primarily the different or additional features and characteristics. As before, the instruction may explicitly specify or otherwise indicate (e.g., implicitly indicate) a source operation mask 411B and a destination (e.g., a destination storage location). As before, an embodiment of a consolidated operation mask 418B may be stored in the destination in response to and/or as a result of the instruction. Similar to before, in some embodiments, the consolidated operation mask may include the unmasked elements (e.g., the set bits or "1" bit values according to the illustrated convention) from the source operation mask 411B consolidated together in the destination. However, in this most significant position version of the instruction/operation, all four unmasked elements (e.g., the set or "1" bit values according to the illustrated convention) are stored in the highest order or most significant 4-bits of the consolidated operation mask. In particular, the consolidated operation mask includes, from lowest order bit-0 (on the right) to highest order bit-7 (on the left), the bit values 0, 0, 0, 0, 1, 1, 1, 1.

These are just a few illustrative examples of suitable operation mask consolidation operations. Other examples of suitable starting 8-bit operation masks (on the left), and resulting consolidated operation masks (on the right), from lowest order bit-0 (on the right) to highest order bit-7 (on the left), include but are not limited to:

10000001→00000011 (least significant version)
    01010100→00000111 (least significant version)
    00101111→00011111 (least significant version)
    10000001→11000000 (most significant version)
    01010100→11100000 (most significant version)
    00101111→11111000 (most significant version)

Other embodiments pertain to operation mask consolidation instructions/operations that operate on 16-bit operation masks. For example, other examples of suitable starting 16-bit operation masks (on the left), and resulting consolidated 16-bit operation masks (on the right), from lowest order bit-0 (on the right) to highest order bit-7 (on the left), include but are not limited to:

1000000001100001→0000000000001111 (least significant version)
    1000000000000001→0000000000000011 (least significant version)
    0001010011001110→1111111000000000 (most significant version)
    0100111110111100→1111111111000000 (most significant version)

Still other embodiments pertain to operation mask consolidation instructions/operations that operate on 64-bit operation masks, or those having other numbers of bits. Moreover, if desired, consolidation to an intermediate (e.g., center or central) position may optionally be used instead of starting at the least or most significant bit.

FIG. 5 is a block flow diagram of an embodiment of a method 530 of processing an embodiment of an operation mask consolidation instruction. In various embodiments, the method may be performed by a general-purpose, special-purpose processor, or other instruction processing apparatus or digital logic device. In some embodiments, the operations and/or method of FIG. 5 may be performed by and/or within the processor of FIG. 1 and/or the apparatus FIG. 3. The components, features, and specific optional details described herein for the processor of FIG. 1 and the apparatus of FIG. 3 also optionally apply to the operations and/or method of FIG. 5. Alternatively, the operations and/or method of FIG. 5 may be performed by and/or within a similar or entirely different processor or apparatus. Moreover, the processor of FIG. 1 and/or the apparatus of FIG. 3 may perform operations and/or methods the same as, similar to, or different than those of FIG. 5.

The method includes receiving the operation mask consolidation instruction, at block 531. In various aspects, the instruction may be received at a processor, an instruction processing apparatus, or a portion thereof (e.g., an instruction fetch unit, a decoder, an instruction converter, etc.). In various aspects, the instruction may be received from an off-die source (e.g., from a main memory, a disc, or an interconnect), or from an on-die source (e.g., from an instruction fetch unit or an instruction cache). The operation mask consolidation instruction may specify or otherwise indicate a source operation mask and a destination storage location. In some embodiments, the source operation mask may include a plurality of masked elements (e.g., mask bits cleared to binary zero) disposed within a plurality of unmasked elements (e.g., mask bits set to binary one).

A consolidated operation mask may be stored in the destination storage location in response to and/or as a result of the operation mask consolidation instruction, at block 532. Representatively, an execution unit, instruction processing apparatus, or processor may perform the operation specified by the instruction and store the result. In some embodiments, the consolidated operation mask may include the unmasked elements from the source operation mask consolidated together.

In some embodiments, in the consolidated operation mask there may be no masked elements disposed between the unmasked elements. In some embodiments, the unmasked elements may be consolidated in a least significant portion of the consolidated operation mask or register. Alternatively, the unmasked elements may be consolidated in a most significant portion of the consolidated operation mask or register. In some embodiments, the operation mask consolidation instruction may be operable to indicate whether the least or more significant portion is to be used (e.g., through one or more bits or a field).

The illustrated method involves architecturally visible operations (e.g., those visible from a software perspective). In other embodiments, the method may optionally include one or more microarchitectural operations. By way of example, the instruction may be fetched, decoded, scheduled out of order, source operands may be accessed, an execution unit or logic may be enabled to perform and may perform microarchitectural operations to implement the instruction, results may be put back into program order and committed, etc. Different microarchitectural ways of performing the operation are contemplated.

Figure 6:
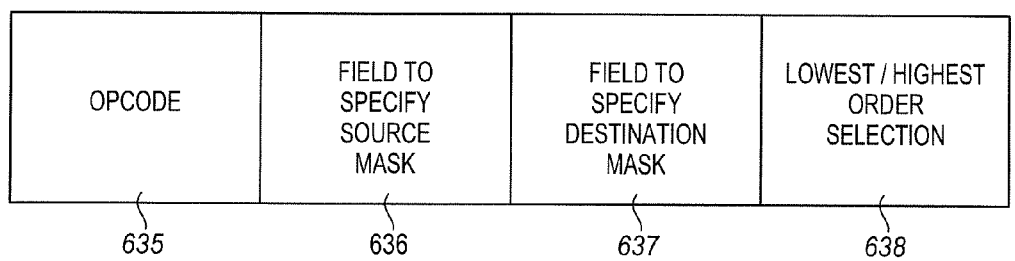
FIG. 6 is a block diagram of an embodiment of suitable format for an operation mask consolidation instruction.

FIG. 6 is a block diagram of an embodiment of a suitable instruction format 634 for an operation mask consolidation instruction. The instruction format includes an operation code or opcode 635. The opcode may represent a plurality of bits or one or more fields that are operable to identify the instruction and/or the operation to be performed. The instruction format also includes a field 636 to specify a source operation mask, and a field 637 to specify a destination storage location. By way of example, each of these specifiers may include bits or one or more fields to specify an address of a register, memory location, or other storage location. In some embodiments, each of these may indicate a potentially the same or potentially different packed data operation mask register. In one particular embodiment, each of these may include 3-bits to select one of eight packed data operation mask registers. In other embodiments, a single field may be used to indicate a single source which is also used as a destination. In still other embodiments, an implicit source and/or implicit destination may optionally be used. In some embodiments, the format may also optionally include one or more bits or a field 638 to indicate a lowest order or highest order selection. This may indicate whether unmasked elements are consolidated to a highest or lowest order portion of the mask. Alternate embodiments may include a subset of the specifiers, may add additional fields, may overlap certain fields, etc. The illustrated order/arrangement of the fields and is not required, but rather the fields may be rearranged. Fields need not include contiguous sequences of bits but rather may be composed of non-contiguous or separated bits.

The operation mask consolidation instructions disclosed herein are general-purpose instructions and have general utility. For example, these operation mask manipulation instructions/operations may be used, either alone or in combination with other instructions, to consolidate or otherwise manipulate operation masks in various different ways that are useful and desired for the particular application, algorithm, or code.

In some embodiments, the operation mask consolidation instructions/operations may be used to help vectorize code. For example, a compiler may use the operation mask consolidation instructions/operations to help auto-vectorize code where the underlying code operations only on the unmasked values in the operation mask. In some embodiments, the operation mask consolidation instructions/operations may be used facilitate auto-vectorization of conditional loop increment code (e.g., accelerate or speed up conditional auto increment of counter values for multiple iterations of a loop). Conditional loop increment operations tend to be challenging for a compiler to auto-vectorize. By way of example, an incremental count may be included in a first register, such as, for example, the values 1, 2, 3, 4, 5, 6, 7, 8. A consolidated mask may be included in a second register, including for example the values 0, 0, 0, 0, 1, 1, 1, 1. Each of the values in the consolidated mask may represent a different iteration of the loop. The presence of four set mask bits may be used to efficiently select the value 4 from the first register which may be used to increment a counter or variable in a loop efficiently without having to go through each increment. Such conditions commonly occur in high performance computing applications as well as more generally. Such improved vectorization may help to increase utilization of wide vector widths, increase performance, and reduce power consumption. It may also help to increase per-thread performance.

Alternatively, the instructions/operations may be used for other purposes besides promoting increased vectorization. In some embodiments, the operation mask consolidation instructions/operations may be used to rearrange the unmasked elements so that they are easier or faster to count or otherwise process (e.g., count or identify the total number of unmasked elements). In still other embodiments, the operation mask consolidation instructions/operations may be used to manipulate the operation masks for use or consumption by other instructions (e.g., other operation mask manipulation instructions, masked packed data instructions, etc.). However, the scope of the invention is not limited to just these particular uses. Other uses will be apparent to those skilled in the art based on the present disclosure.

Figure 7:
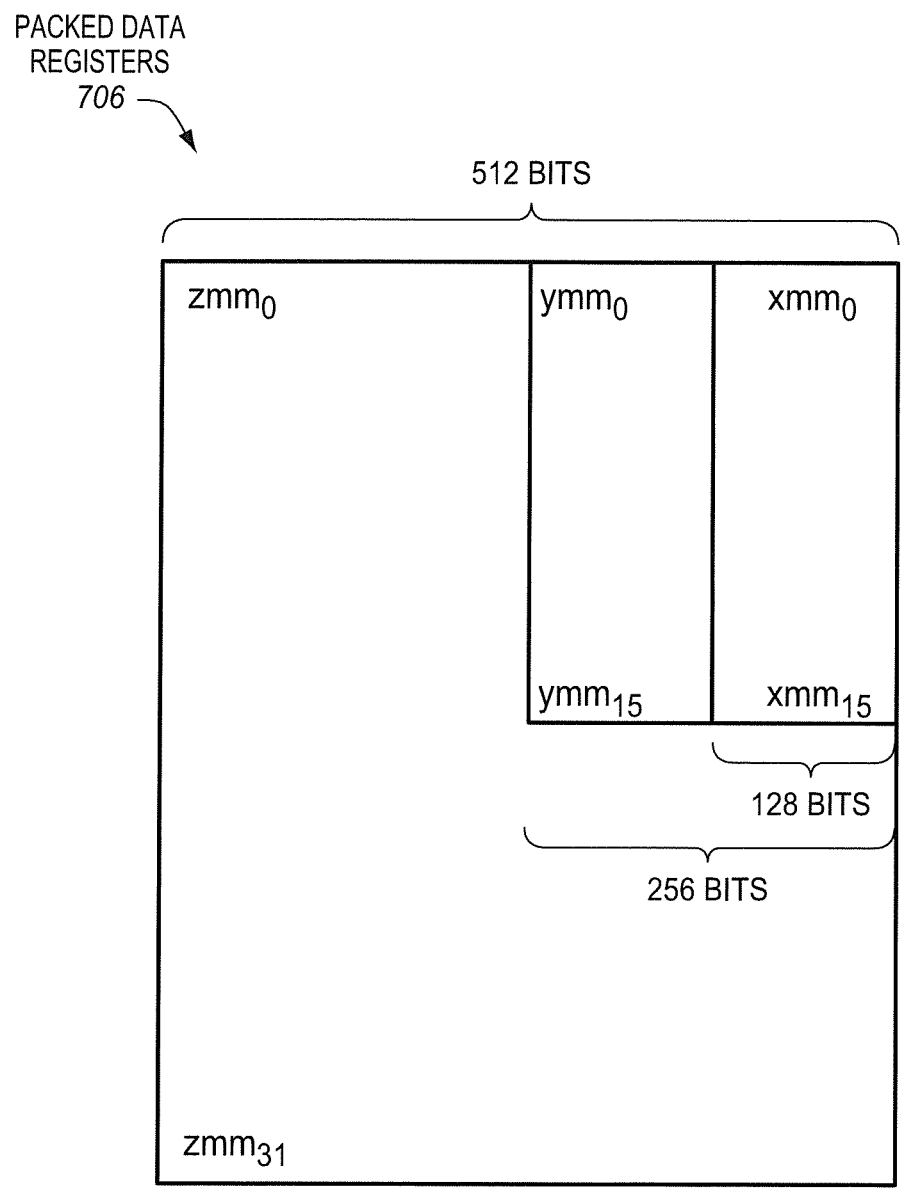
FIG. 7 is a block diagram of an example embodiment of suitable packed data registers.

FIG. 7 is a block diagram of an example embodiment of a suitable set of packed data registers 706. The illustrated packed data registers include thirty-two 512-bit wide packed data or vector registers. These thirty-two 512-bit wide registers are labeled ZMM0 through ZMM31. In the illustrated embodiment, the lower order 256-bits of the lower sixteen of these registers, namely ZMM0-ZMM15, are aliased or overlaid on respective 256-bit wide packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit wide registers ZMM0 through ZMM31 are operable to hold 512-bit packed data, 256-bit packed data, or 128-bit packed data. The 256-bit wide registers YMM0-YMM15 are operable to hold 256-bit packed data, or 128-bit packed data. The 128-bit wide registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

One example of a suitable packed data format is a 256-bit packed word format which is 256-bits wide and includes sixteen 16-bit word data elements. Another example is a 256-bit packed doubleword format which is 256-bits wide and includes eight 32-bit doubleword (dword) data elements. Yet another example is a 256-bit packed quadword format which is 256-bits wide and includes four 64-bit quadword data elements. Other packed data formats are also suitable. For example, other suitable 256-bit packed data formats include 256-bit packed 8-bit byte format, 256-bit packed 32-bit single precision floating point format, and 256-bit packed 64-bit double precision floating point format. Moreover, packed data formats either larger and/or smaller than 256-bits are also suitable. For example, 512-bit (or larger) packed data formats and/or 128-bit (or smaller) packed data formats of the aforementioned data types are also suitable. In general, the 512-bit packed data formats may have twice as many data elements as the 256-bit packed data formats for the same data type, while the 128-bit packed data formats may have half as many data elements as the 256-bit packed data formats for the same data type. Generally, the number of packed data elements is equal to the size in bits of the packed data divided by the size in bits of the packed data elements.

Figures 8, 9:
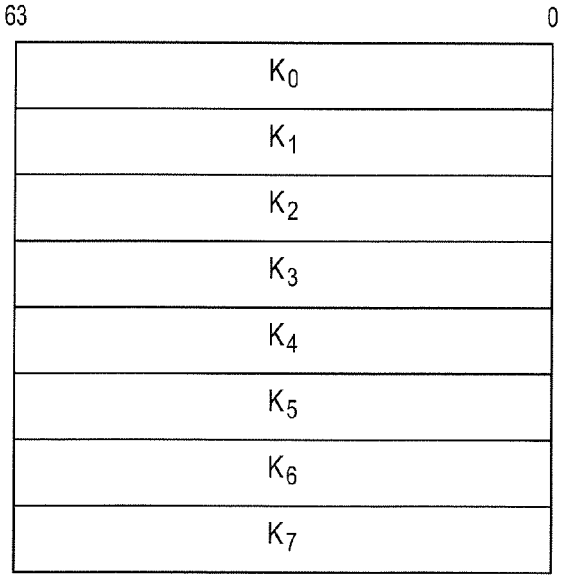
FIG. 8 is a table illustrating that a number of packed data operation mask elements depends on packed data width and packed data element width.
FIG. 9 is a block diagram of an example embodiment of a suitable set of packed data operation mask registers.

FIG. 8 is a table illustrating that the number of packed data operation mask bits 840 depends upon the packed data width and the packed data element width. Packed data widths of 128-bits, 256-bits, and 512-bits are shown, although other widths are also possible. Packed data element widths of 8-bit bytes, 16-bit words, 32-bit doublewords (dwords) or single precision floating point, and 64-bit quadwords (Qwords) or double precision floating point are considered, although other widths are also possible.

As shown, when the packed data width is 128-bits, 16-bits may be used for masking when the packed data element width is 8-bits, 8-bits may be used for masking when the packed data element width is 16-bits, 4-bits may be used for masking when the packed data element width is 32-bits, and 2-bits may be used for masking when the packed data element width is 64-bits. When the packed data width is 256-bits, 32-bits may be used for masking when the packed data element width is 8-bits, 16-bits may be used for masking when the packed data element width is 16-bits, 8-bits may be used for masking when the packed data element width is 32-bits, and 4-bits may be used for masking when the packed data element width is 64-bits. When the packed data width is 512-bits, 64-bits may be used for masking when the packed data element width is 8-bits, 32-bits may be used for masking when the packed data element width is 16-bits, 16-bits may be used for masking when the packed data element width is 32-bits, and 8-bits may be used for masking when the packed data element width is 64-bits.

FIG. 9 is a block diagram of an example embodiment of a suitable set of packed data operation mask registers 907. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits wide. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit. Examples of suitable registers include, but are not limited to, dedicated physical registers, dynamically allocated physical registers using register renaming, and combinations thereof.

In some embodiments, the packed data operation mask registers 1008 may be a separate, dedicated set of architectural registers. By way of example, the masked packed data instructions may use three bits (e.g., a 3-bit field) to encode or specify any one of the eight packed data operation mask registers k0 through k7. In alternate embodiments, either fewer or more bits may be used when there are fewer or more packed data operation mask registers, respectively. In one particular implementation, only packed data operation mask registers k1 through k7 (but not k0) may be addressed as a predicate operand to predicate a masked packed data operation. The register k0 may be used as a regular source or destination, but may not be encoded as a predicate operand (e.g., if k0 is specified it has an all ones or "no mask" encoding). In other embodiments, either all or only some of the registers may be encoded as a predicate operand.

Figure 10:
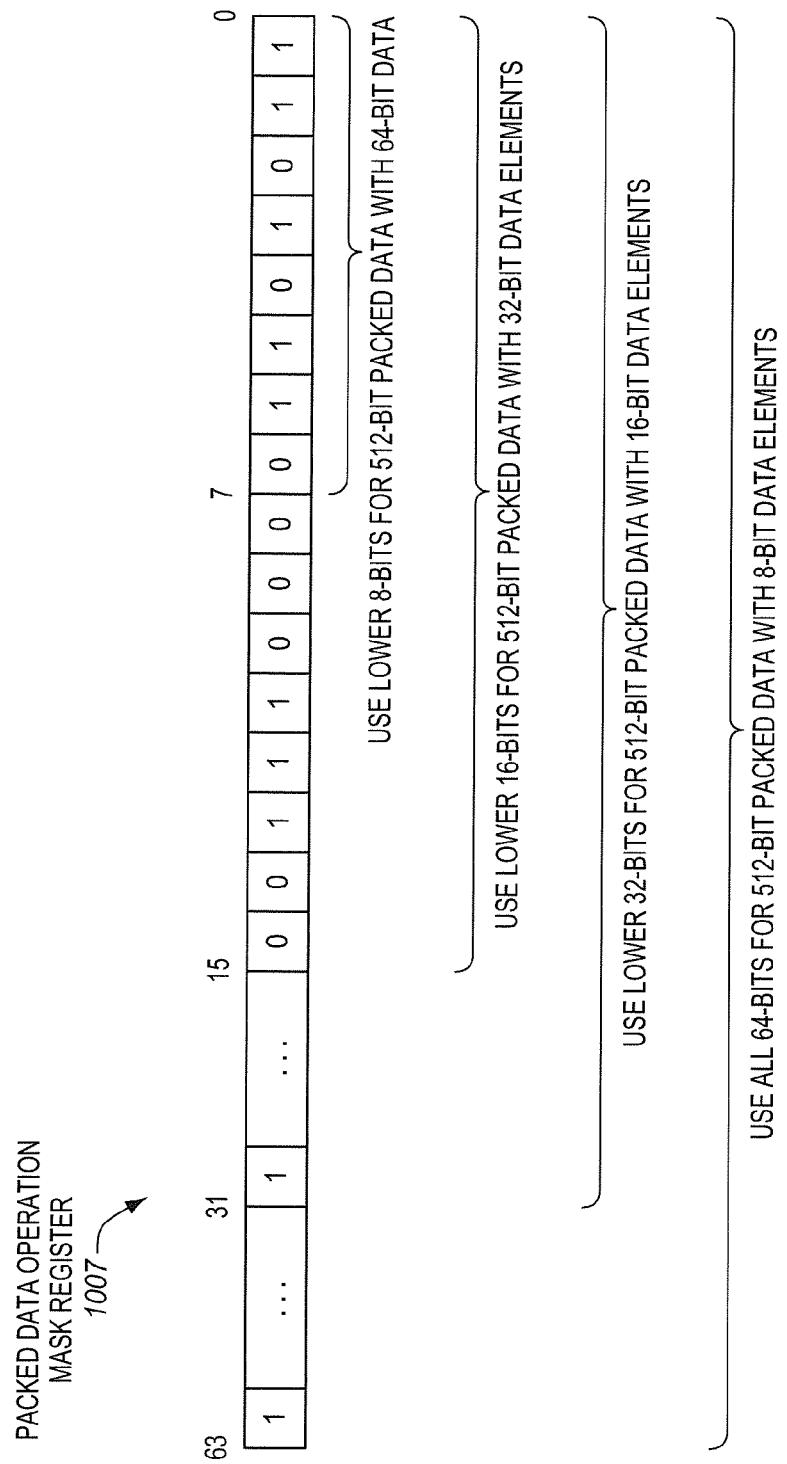
FIG. 10 is a block diagram of an example embodiment of a packed data operation mask register in which a number of operation mask elements depends on packed data width and packed data element width.

FIG. 10 is a diagram illustrating an example embodiment of a packed data operation mask register 1007 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits.

Several illustrative examples are shown. Namely, when the packed data width is 512-bits and the packed data element width is 64-bits, then only the lowest-order 8-bits of the register are used as the packed data operation mask. When the packed data width is 512-bits and the packed data element width is 32-bits, then only the lowest-order 16-bits of the register are used as the packed data operation mask. When the packed data width is 512-bits and the packed data element width is 16-bits, then only the lowest-order 32-bits of the register are used as the packed data operation mask. When the packed data width is 512-bits and the packed data element width is 8-bits, then all 64-bits of the register are used as the packed data operation mask. In accordance with the illustrated embodiment, a masked packed data instruction may access and/or utilize only the number of lowest order or least significant bits of the register used for the packed data operation mask based on that instructions associated packed data width and data element width.

In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however an analgous principle applies for other packed data widths, such as, for example, 256-bit and 128-bit widths. As previously mentioned, the use of a 64-bit packed data operation mask register is not required.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 1911; and see Intel® Advanced Vector Extensions Programming Reference, June 1911).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIIVID vector registers to be longer than 118 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

Figure 11:
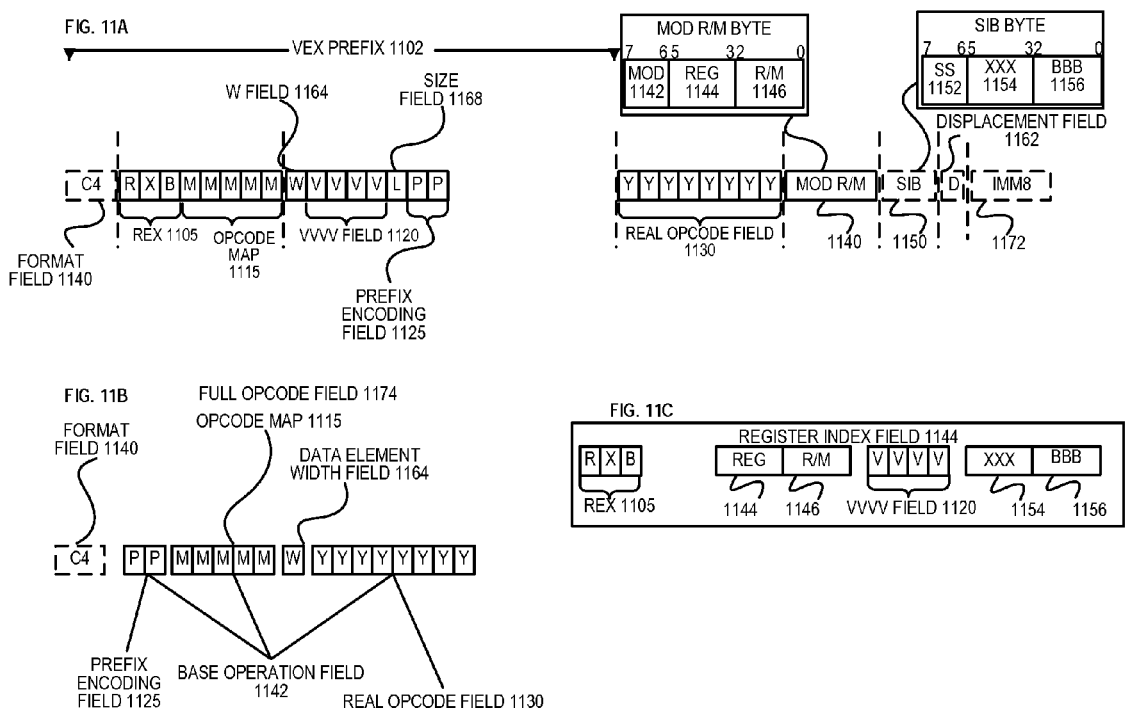
FIG. 11A illustrates an exemplary AVX instruction format including a VEX prefix, real opcode field, Mod R/M byte, SIB byte, displacement field, and IMM8.
FIG. 11B illustrates which fields from FIG. 11A make up a full opcode field and a base operation field.
FIG. 11C illustrates which fields from FIG. 11A make up a register index field.

FIG. 11A illustrates an exemplary AVX instruction format including a VEX prefix 1102, real opcode field 1130, Mod R/M byte 1140, SIB byte 1150, displacement field 1162, and IMM8 1172. FIG. 11B illustrates which fields from FIG. 11A make up a full opcode field 1174 and a base operation field 1142. FIG. 11C illustrates which fields from FIG. 11A make up a register index field 1144.

VEX Prefix (Bytes 0-2) 1102 is encoded in a three-byte form. The first byte is the Format Field 1140 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1105 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (nr, xxx, and bbb), so that Rrrr, Xxxx, and Bbbb may be formed by adding VEX.R, VEX.X, and VEX.B. Opcode map field 1114 (VEX byte 1, bits [4:0]-mmmmm) includes content to encode an implied leading opcode byte. W Field 1164 (VEX byte 2, bit [7]-W)—is represented by the notation VEX.W, and provides different functions depending on the instruction. The role of VEX.vvvv 1119 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1168 Size field (VEX byte 2, bit [2]-L)=0, it indicates 118 bit vector; if VEX.L=1, it indicates 256 bit vector. Prefix encoding field 1125 (VEX byte 2, bits [1:0]-pp) provides additional bits for the base operation field.

Real Opcode Field 1130 (Byte 3) is also known as the opcode byte. Part of the opcode is specified in this field.

MOD R/M Field 1140 (Byte 4) includes MOD field 1142 (bits [7-6]), Reg field 1144 (bits [5-3]), and R/M field 1146 (bits [2-0]). The role of Reg field 1144 may include the following: encoding either the destination register operand or a source register operand (the rrr of Rar), or be treated as an opcode extension and not used to encode any instruction operand. The role of R/M field 1146 may include the following: encoding the instruction operand that references a memory address, or encoding either the destination register operand or a source register operand.

Scale, Index, Base (SIB)—The content of Scale field 1150 (Byte 5) includes SS1152 (bits [7-6]), which is used for memory address generation. The contents of SIB.xxx 1154 (bits [5-3]) and SIB.bbb 1156 (bits [2-0]) have been previously referred to with regard to the register indexes Xxxx and Bbbb.

The Displacement Field 1162 and the immediate field (IMM8) 1172 contain address data.

Exemplary Register Architecture

FIG. 12 is a block diagram of a register architecture 1200 according to one embodiment of the invention. In the embodiment illustrated, there are 32 vector registers 1210 that are 511 bits wide; these registers are referenced as zmm0 through zmm31. The lower order 256 bits of the lower 15 zmm registers are overlaid on registers ymm0-15. The lower order 118 bits of the lower 15 zmm registers (the lower order 118 bits of the ymm registers) are overlaid on registers xmm0-14.

Write mask registers 1214—in the embodiment illustrated, there are 8 write mask registers (k0 through k7), each 64 bits in size. In an alternate embodiment, the write mask registers 1214 are 15 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R14.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1311, a register read/memory read stage 1313, an execute stage 1315, a write back/memory write stage 1317, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1311; 5) the physical register file(s) unit(s) 1358 and the memory unit 1370 perform the register read/memory read stage 1313; the execution cluster 1360 perform the execute stage 1315; 6) the memory unit 1370 and the physical register file(s) unit(s) 1358 perform the write back/memory write stage 1317; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1411 and vector registers 1413) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1011-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1413. Specifically, the vector unit 1410 is a 15-wide vector processing unit (VPU) (see the 15-wide ALU 1428), which executes one or more of integer, single-precision float, and double-precision float instructions. The VPU supports swizzling the register inputs with swizzle unit 1419, numeric conversion with numeric convert units 1422A-B, and replication with replication unit 1424 on the memory input. Write mask registers 1426 allow predicating resulting vector writes.

Processor with Integrated Memory Controller and Graphics

Figure 15:
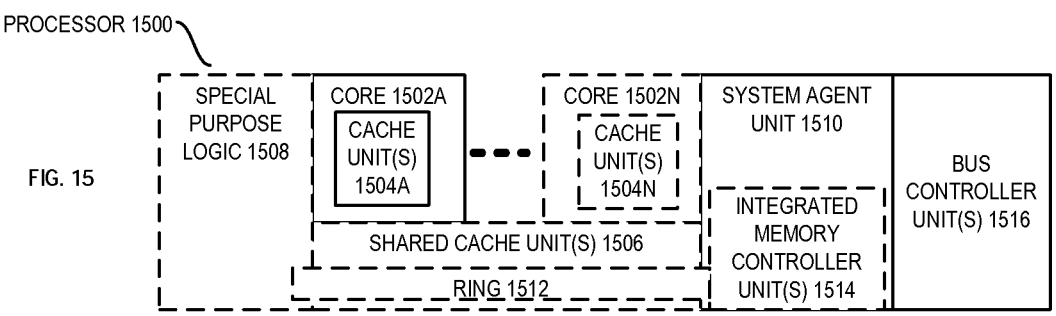
FIG. 15 is a block diagram of a processor that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1515, while the optional addition of the dashed lined boxes illustrates an alternative processor 1500 with multiple cores 1502A-N, a set of one or more integrated memory controller unit(s) 1513 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1513. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1511 interconnects the integrated graphics logic 1508, the set of shared cache units 1506, and the system agent unit 1510/integrated memory controller unit(s) 1513, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
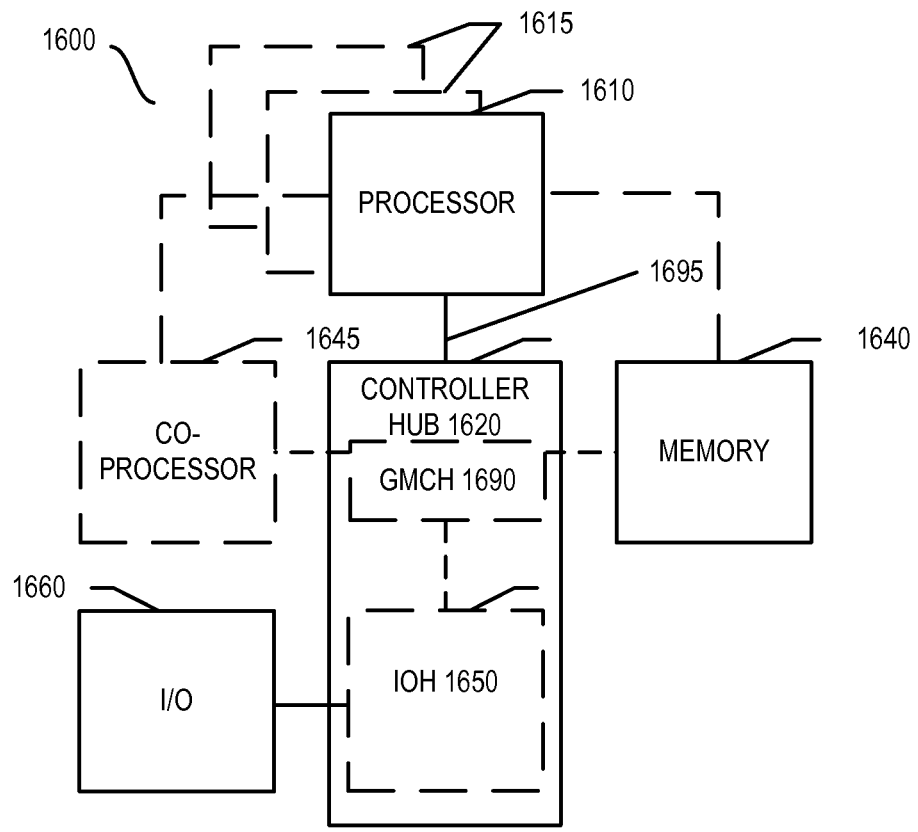
FIG. 16 shown is a block diagram of a system in accordance with one embodiment of the present invention.

Referring now to FIG. 16, shown is a block diagram of a system 1600 in accordance with one embodiment of the present invention. The system 1600 may include one or more processors 1610, 1614, which are coupled to a controller hub 1619. In one embodiment the controller hub 1619 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1619 in a single chip with the IOH 1650.

The optional nature of additional processors 1614 is denoted in FIG. 16 with broken lines. Each processor 1610, 1614 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1619 communicates with the processor(s) 1610, 1614 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1619 may include an integrated graphics accelerator.

There can be a variety of differences between the physical resources 1610, 1614 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
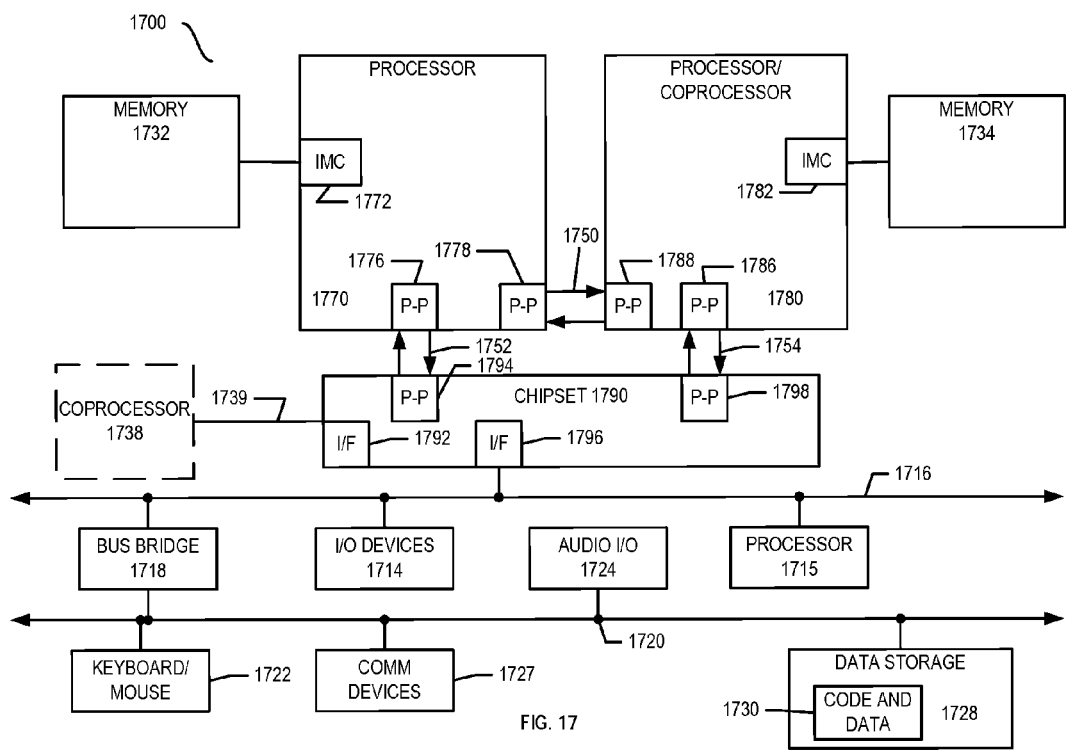
FIG. 17 shown is a block diagram of a first more specific exemplary system in accordance with an embodiment of the present invention.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1614, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1715 via an interface 1796. In one embodiment, first bus 1715 may be a Peripheral Component Interconnect (PCI) bus, or a bus such as a PCI Express bus or another third generation I/O interconnect bus, although the scope of the present invention is not so limited.

As shown in FIG. 17, various I/O devices 1713 may be coupled to first bus 1715, along with a bus bridge 1717 which couples first bus 1715 to a second bus 1719. In one embodiment, one or more additional processor(s) 1714, such as coprocessors, high-throughput MIC processors, GPGPU's, accelerators (such as, e.g., graphics accelerators or digital signal processing (DSP) units), field programmable gate arrays, or any other processor, are coupled to first bus 1715. In one embodiment, second bus 1719 may be a low pin count (LPC) bus. Various devices may be coupled to a second bus 1719 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1719. Note that other architectures are possible. For example, instead of the point-to-point architecture of FIG. 17, a system may implement a multi-drop bus or other such architecture.

Figure 18:
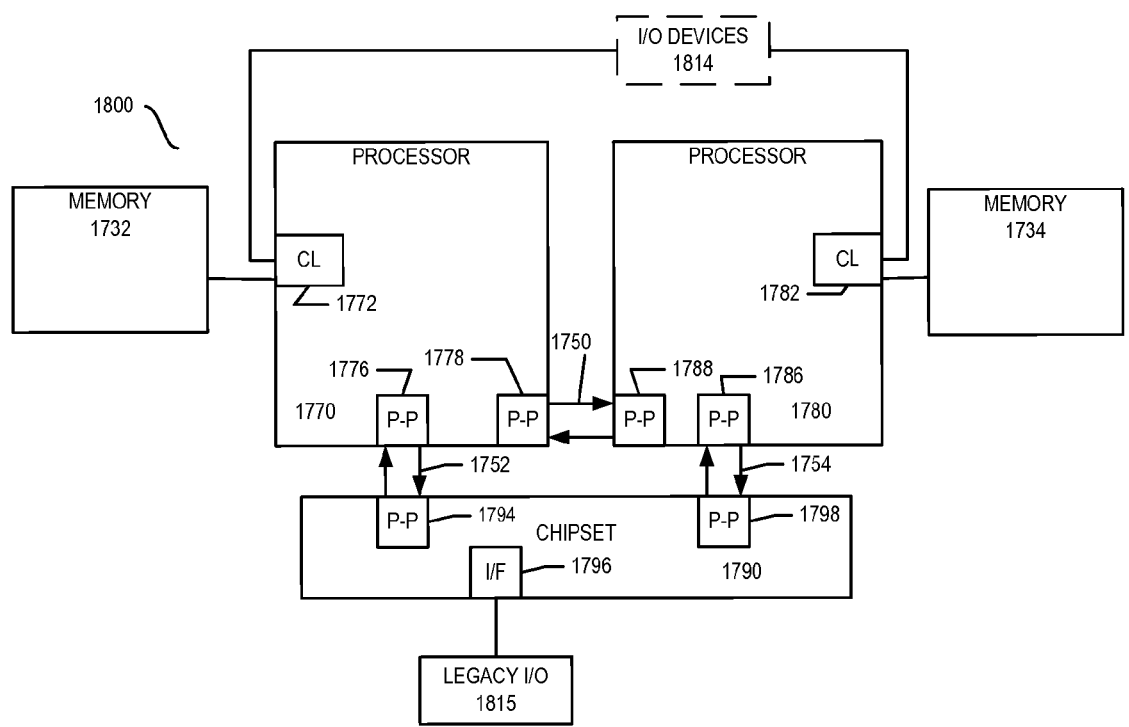
FIG. 18, shown is a block diagram of a second more specific exemplary system in accordance with an embodiment of the present invention.

Referring now to FIG. 18, shown is a block diagram of a second more specific exemplary system 1800 in accordance with an embodiment of the present invention Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1813 are also coupled to the control logic 1772, 1782. Legacy I/O devices 1814 are coupled to the chipset 1790.

Figure 19:
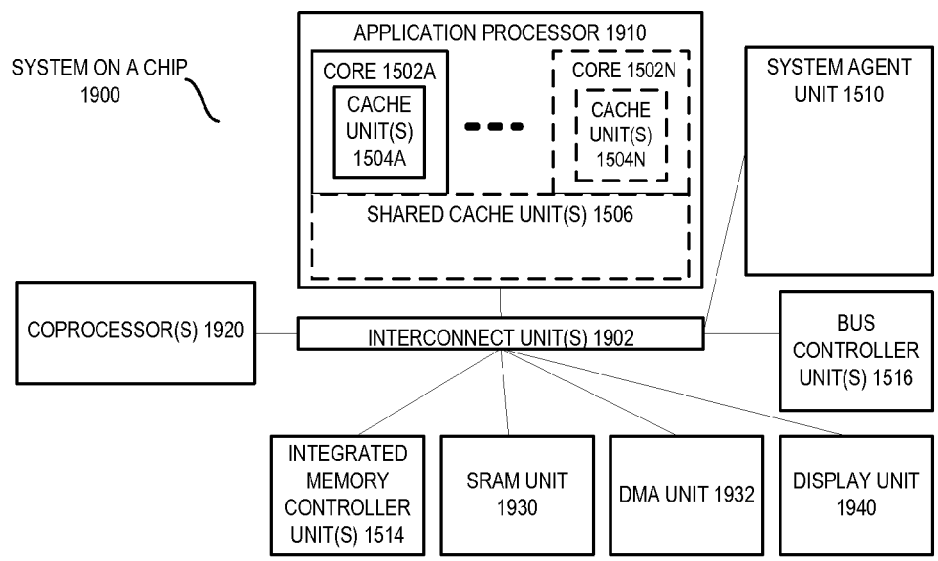
FIG. 19 shown is a block diagram of a SoC in accordance with an embodiment of the present invention.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 192A-N and shared cache unit(s) 1506; a system agent unit 1510; a bus controller unit(s) 1515; an integrated memory controller unit(s) 1513; a set or one or more coprocessors 1919 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1919 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
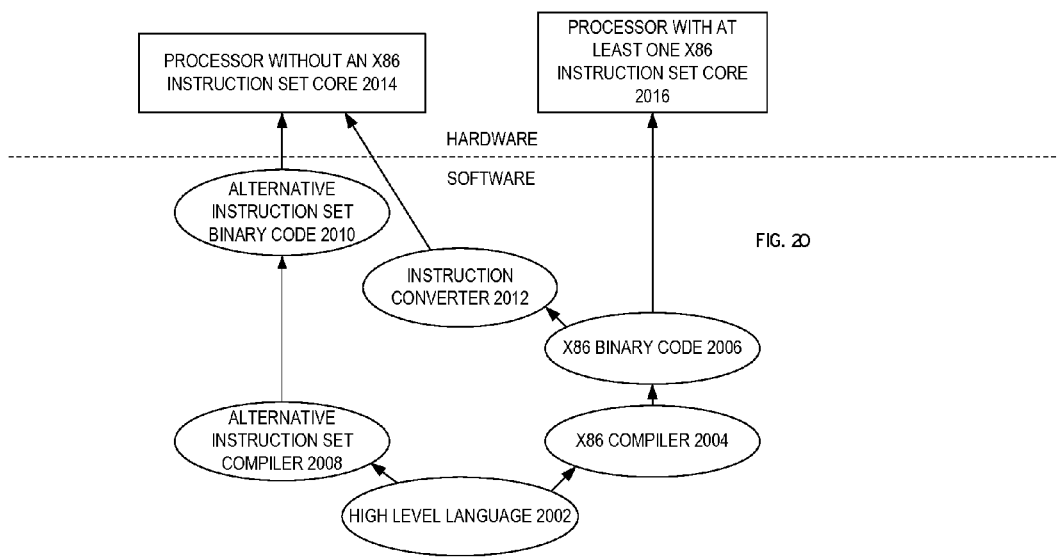
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2015. The processor with at least one x86 instruction set core 2015 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2015. Similarly, FIG. 20 shows the program in the high level language 2002 may be compiled using an alternative instruction set compiler 2008 to generate alternative instruction set binary code 2010 that may be natively executed by a processor without at least one x86 instruction set core 2013 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2011 is used to convert the x86 binary code 2006 into code that may be natively executed by the processor without an x86 instruction set core 2013. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2011 represents software, firmware, hardware, or a combination thereof that, through emulation, simulation or any other process, allows a processor or other electronic device that does not have an x86 instruction set processor or core to execute the x86 binary code 2006.

In some embodiments, the operation mask widths of 8-bits, 16-bits, 32-bits, and 64-bits, or some combination thereof, may optionally be supported. In some embodiments, an instruction set may include a different operation mask consolidation instruction for each supported different operation mask width. An opcode of the operation mask consolidation instruction may implicitly indicate the width of the operation mask. Alternatively, an operation mask consolidation instruction may be used for multiple supported different operation mask widths. For example, the operation mask consolidation instruction may have one or more bits or a field to indicate the operation mask width to use.

In some embodiments, an opcode of the operation mask consolidation instruction may indicate that an operation mask consolidation operation is to be performed without particular data rearrangement operations needing to be explicitly specified (e.g., through permute control data) and without a particular single or limited set of data rearrangement operations being required. In response to an opcode of the instruction, a consolidated operation mask may be stored irrespective or regardless of any particular arrangement of masked and unmasked elements in the source operation mask. In some embodiments, the instruction does not explicitly specify how the masked and unmasked elements are to be moved, rearranged, or permuted to generate the consolidated operation mask. In some embodiments, the operation mask consolidation instruction will move the elements differently depending upon the arrangement of the masked and unmasked elements, without explicitly specifying how the elements will be moved or rearranged, to generate the operation mask.

Components, features, and details described for any of FIGS. 4A, 4B, 6, and 7-10 may also optionally be used in any of FIGS. 1, 3, and 5. Moreover, components, features, and details described herein for any of the apparatus may also optionally be used in any of the operations and methods described herein, which in embodiments may be performed by and/or with such the apparatus. The optional features and details of the operation masks described for FIGS. 2A/2B may also apply to the operation masks of any of FIGS. 1, 3, 4A, 4B, and 5.

EXAMPLE EMBODIMENTS

The following examples pertain to further embodiments. Specifics in the examples may be used anywhere in one or more embodiments.

Example 1 is an instruction processing apparatus. The instruction processing apparatus includes a plurality of operation mask registers. The instruction processing apparatus also includes a decode unit to receive an operation mask consolidation instruction. The operation mask consolidation instruction is to indicate a source operation mask register, of the plurality of operation mask registers, and a destination storage location. The source operation mask register is to include a source operation mask that is to include a plurality of masked elements that are to be disposed within a plurality of unmasked elements. The instruction processing apparatus also includes an execution unit coupled with the decode unit. The execution unit, in response to the operation mask consolidation instruction, is to store a consolidated operation mask in the destination storage location. The consolidated operation mask is to include the unmasked elements from the source operation mask consolidated together.

Example 2 includes the subject matter of Example 1 and optionally in which the execution unit, in response to the operation mask consolidation instruction, is to consolidate together the unmasked elements so that the masked elements are not disposed within the consolidated unmasked elements.

Example 3 includes the subject matter of Example 1 and optionally in which the execution unit, in response to the operation mask consolidation instruction, is to consolidate together the unmasked elements from the source operation mask in a least significant portion of the consolidated operation mask.

Example 4 includes the subject matter of Example 1 and optionally in which the execution unit, in response to the operation mask consolidation instruction, is to consolidate together the unmasked elements from the source operation mask in a most significant portion of the consolidated operation mask.

Example 5 includes the subject matter of Example 1 and optionally in which the decode unit is to receive the operation mask consolidation instruction. The operation mask consolidation instruction is to include one or more bits that are operable to have a first value to indicate that the unmasked elements from the source operation mask are to be consolidated together in a least significant portion of the consolidated operation mask. The operation mask consolidation instruction is to have a second value to indicate that the unmasked elements from the source operation mask are to be consolidated together in a most significant portion of the consolidated operation mask.

Example 6 includes the subject matter of Example 1 and optionally in which the source operation mask register is to have the source operation mask in which each of the masked and unmasked elements a different single bit.

Example 7 includes the subject matter Example 6 and optionally in which each masked element is to have a value of binary zero and each unmasked element has a value of binary one.

Example 8 includes the subject matter of Example 1 and optionally in which the plurality of operation mask registers comprise a set of eight operation mask registers, in which each of the eight operation mask registers is to store an operation mask that is to have up to at least 64-bits, and in which the decode unit is to receive the operation mask consolidation instruction that is to have a 3-bit field to specify the source operation mask register as one of the eight operation mask registers.

Example 9 includes the subject matter of Example 1 in which the decode unit is to receive the operation mask consolidation instruction that is to explicitly specify the source operation mask register and that is to explicitly specify a destination operation mask register as the destination storage location.

Example 10 includes the subject matter of any of Example 1-9 in which the decode unit is to receive the operation mask consolidation instruction that is to have an opcode that is to indicate that the consolidated operation mask is to be stored regardless of any particular arrangement of the masked and unmasked elements in the source operation mask.

Example 11 includes the subject matter of any of Example 1-9 in which the operation mask registers are to store operation masks that are to be used to predicate operations on packed data.

Example 12 is a method within a processor. The method includes receiving an operation mask consolidation instruction. The operation mask consolidation instruction indicates a source operation mask and a destination storage location. The source operation mask includes a plurality of masked elements disposed within a plurality of unmasked elements. The method also includes storing a consolidated operation mask in the destination storage location in response to the operation mask consolidation instruction. The consolidated operation mask includes the unmasked elements from the source operation mask consolidated together.

Example 13 includes the subject matter of Example 12 in which the unmasked elements from the source operation mask are consolidated together in a least significant portion of the consolidated operation mask.

Example 14 includes the subject matter of Example 12 in which the unmasked elements from the source operation mask are consolidated together in a most significant portion of the consolidated operation mask.

Example 15 includes the subject matter of Example 12 in which the operation mask consolidation instruction includes one or more bits that are to have a first value to indicate that the unmasked elements from the source operation mask are to be consolidated together in a least significant portion of the consolidated operation mask. The one or more bits are to have a second value to indicate that the unmasked elements from the source operation mask are to be consolidated together in a most significant portion of the consolidated operation mask.

Example 16 includes the subject matter of Example 12 in which receiving comprises receiving the instruction indicating the source operation mask in which each of the masked and unmasked elements is a different single bit, and in which each masked element has a value of binary zero and each unmasked element has a value of binary one.

Example 17 includes the subject matter of Example 12 in which receiving comprises receiving the operation mask consolidation instruction having an opcode that indicates that the consolidated operation mask is to be stored regardless of any particular arrangement of the masked and unmasked elements in the source operation mask.

Example 18 includes the subject matter of Example 12 in which each of the masked and unmasked elements corresponds to a different packed data element and is used to predicate an operation on the corresponding packed data element.

Example 19 includes the subject matter of Example 12 further comprising a compiler using the consolidated operation mask to vectorize code.

Example 20 is a system to process instructions. The system includes an interconnect. The system also includes a processor coupled with the interconnect and a dynamic random access memory (DRAM) coupled with the interconnect. The DRAM stores an operation mask consolidation instruction. The operation mask consolidation instruction is to indicate a source operation mask and a destination storage location. The source operation mask is to include a plurality of masked elements that are to be disposed within a plurality of unmasked elements. The operation mask consolidation instruction, if executed by the processor, is operable to cause the processor to perform operations including storing a consolidated operation mask in the destination storage location. The consolidated operation mask to include the unmasked elements from the source operation mask consolidated together.

Example 21 includes the subject matter of Example 20 in which the source operation mask is to be used to predicate operations on packed data.

Example 22 includes the subject matter of any of Examples 20-21, in which the operation mask consolidation instruction is to have an opcode that is to indicate that the consolidated operation mask is to be stored for any value of the source operation mask.

Example 23 is an article of manufacture. The article of manufacturing includes a non-transitory machine-readable storage medium storing a operation mask consolidation instruction. The operation mask consolidation instruction is to indicate a source operation mask and a destination. The source operation mask is to include a plurality of masked elements disposed within a plurality of unmasked elements. The operation mask consolidation instruction if executed by a machine operable to cause the machine to perform operations including storing a consolidated operation mask in the destination in response to the operation mask consolidation instruction. The consolidated operation mask is to include the unmasked elements from the source operation mask consolidated together with no masked elements disposed between them.

Example 24 includes the subject matter of Example 23 in which receiving comprises receiving the operation mask consolidation instruction having an opcode that indicates that the consolidated operation mask is to be stored for many different arrangements of the masked and unmasked elements in the source operation mask.

Example 25 includes the subject matter of any of Examples 23-24 in which the operation mask consolidation instruction if executed by the machine is operable to cause the machine to consolidate together the unmasked elements from the source operation mask in a least significant portion of the consolidated operation mask, and in which the source operation mask is to be used for predication.

Example 26 includes a machine-readable storage medium storing instructions that if executed by a machine are to cause the machine to perform the method of any of claims 12-19.

Example 27 includes an apparatus to perform the method of any of claims 12-19.

Example 28 includes an apparatus comprising means for performing the method of any of claims 12-19.

Example 29 includes an apparatus to perform a method substantially as described herein.

Example 30 includes an apparatus comprising means for performing a method substantially as described herein.

Example 31 includes an apparatus to execute an instruction substantially as described herein.

Example 32 includes an apparatus comprising means for performing operations of an instruction substantially as described herein.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show connections and couplings.

In the description and claims, the term "logic" may have been used. As used herein, logic may include a module such as hardware, firmware, software, or various combinations thereof. Examples of logic include integrated circuitry, application specific integrated circuits, analog circuits, digital circuits, programmed logic devices, memory devices including instructions, etc. In some embodiments, hardware logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. In other instances, well-known circuits, structures, devices, and operations have been shown in block diagram form or without detail in order to avoid obscuring the understanding of the description. Where multiple components have been shown and described, in some cases these multiple components may be incorporated into one component. Where a single component has been shown and described, in some cases this single component may be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. An instruction processing apparatus comprising:
   a plurality of operation mask registers;
   a decode unit to receive an operation mask consolidation instruction, the operation mask consolidation instruction to indicate a source operation mask register, of the plurality of operation mask registers, and a destination storage location, the source operation mask register to include a source operation mask that is to include a plurality of masked elements that are to be disposed within a plurality of unmasked elements; and
   an execution unit coupled with the decode unit, the execution unit, in response to the operation mask consolidation instruction, to store a consolidated operation mask in the destination storage location, the consolidated operation mask to include the unmasked elements from the source operation mask consolidated together.

2. The apparatus of claim 1, wherein the execution unit, in response to the operation mask consolidation instruction, is to consolidate together the unmasked elements so that the masked elements are not disposed within the consolidated unmasked elements.

3. The apparatus of claim 1, wherein the execution unit, in response to the operation mask consolidation instruction, is to consolidate together the unmasked elements from the source operation mask in a least significant portion of the consolidated operation mask.

4. The apparatus of claim 1, wherein the execution unit, in response to the operation mask consolidation instruction, is to consolidate together the unmasked elements from the source operation mask in a most significant portion of the consolidated operation mask.

5. The apparatus of claim 1, wherein the decode unit is to receive the operation mask consolidation instruction which is to include one or more bits that are operable to have:
   a first value to indicate that the unmasked elements from the source operation mask are to be consolidated together in a least significant portion of the consolidated operation mask; and
   a second value to indicate that the unmasked elements from the source operation mask are to be consolidated together in a most significant portion of the consolidated operation mask.

6. The apparatus of claim 1, wherein the source operation mask register is to have the source operation mask in which each of the masked and unmasked elements is a different single bit.

7. The apparatus of claim 6, wherein each masked element is to have a value of binary zero and each unmasked element has a value of binary one.

8. The apparatus of claim 1, wherein the plurality of operation mask registers comprise a set of eight operation mask registers, wherein each of the eight operation mask registers is to store an operation mask that is to have up to at least 64-bits, and wherein the decode unit is to receive the operation mask consolidation instruction that is to have a 3-bit field to specify the source operation mask register as one of the eight operation mask registers.

9. The apparatus of claim 1, wherein the decode unit is to receive the operation mask consolidation instruction that is to explicitly specify the source operation mask register and that is to explicitly specify a destination operation mask register as the destination storage location.

10. The apparatus of claim 1, wherein the decode unit is to receive the operation mask consolidation instruction that is to have an opcode that is to indicate that the consolidated operation mask is to be stored regardless of any particular arrangement of the masked and unmasked elements in the source operation mask.

11. The apparatus of claim 1, wherein the operation mask registers are to store operation masks that are to be used to predicate operations on packed data.

12. The apparatus of claim 1, wherein only a subset of bits of the source operation mask register are to be used to store the source operation mask.

13. The apparatus of claim 1, wherein the execution unit, in response to the instruction, is to store the masked elements from the source operation mask consolidated together in a position adjacent to the consolidated together unmasked elements.

14. A method within a processor comprising:
   receiving an operation mask consolidation instruction, the operation mask consolidation instruction indicating a source operation mask and a destination storage location, the source operation mask including a plurality of masked elements disposed within a plurality of unmasked elements; and
   storing a consolidated operation mask in the destination storage location in response to the operation mask consolidation instruction, the consolidated operation mask including the unmasked elements from the source operation mask consolidated together.

15. The method of claim 14, wherein the unmasked elements from the source operation mask are consolidated together in a least significant portion of the consolidated operation mask.

16. The method of claim 14, wherein the unmasked elements from the source operation mask are consolidated together in a most significant portion of the consolidated operation mask.

17. The method of claim 14, wherein the operation mask consolidation instruction comprises one or more bits that are to have:
a first value to indicate that the unmasked elements from the source operation mask are to be consolidated together in a least significant portion of the consolidated operation mask; and
a second value to indicate that the unmasked elements from the source operation mask are to be consolidated together in a most significant portion of the consolidated operation mask.

18. The method of claim 14, further comprising a compiler using the consolidated operation mask to vectorize code.

19. A system to process instructions comprising: an interconnect;
a processor coupled with the interconnect; and
a dynamic random access memory (DRAM) coupled with the interconnect, the DRAM storing an operation mask consolidation instruction, the operation mask consolidation instruction to indicate a source operation mask and a destination storage location, the source operation mask to include a plurality of masked elements that are to be disposed within a plurality of unmasked elements, the operation mask consolidation instruction, if executed by the processor, operable to cause the processor to perform operations comprising:
storing a consolidated operation mask in the destination storage location, the consolidated operation mask to include the unmasked elements from the source operation mask consolidated together.

20. The system of claim 19, wherein the source operation mask is to be used to predicate operations on packed data.

21. An article of manufacture comprising:
a non-transitory machine-readable storage medium storing a operation mask consolidation instruction, the operation mask consolidation instruction to indicate a source operation mask and a destination, the source operation mask to include a plurality of masked elements disposed within a plurality of unmasked elements, and the operation mask consolidation instruction if executed by a machine operable to cause the machine to perform operations comprising:
storing a consolidated operation mask in the destination in response to the operation mask consolidation instruction, the consolidated operation mask to include the unmasked elements from the source operation mask consolidated together with no masked elements disposed between them.

22. The article of claim 21, wherein receiving comprises receiving the operation mask consolidation instruction having an opcode that indicates that the consolidated operation mask is to be stored for many different arrangements of the masked and unmasked elements in the source operation mask.

23. A processor comprising:
a plurality of mask registers;
a decode unit to receive an instruction, the instruction to indicate a source mask register, of the plurality of mask registers, and a destination storage location, the source mask register to include a source mask that is to include a plurality of masked bits that are to be disposed within a plurality of unmasked bits; and
an execution unit coupled with the decode unit, the execution unit, in response to the instruction, to store a result in the destination storage location, the result to include:
the unmasked bits from the source mask consolidated together; and
the masked bits from the source mask consolidated together in a position adjacent to the consolidated together unmasked bits.

24. The processor of claim 23, wherein the destination storage location comprises a destination mask register, and wherein the unmasked bits from the source mask are to be consolidated together in a most significant portion of the destination mask register.

25. A processor comprising:
a plurality of mask registers;
a decode unit to receive an instruction, the instruction to indicate a source mask register, of the plurality of mask registers, and a destination storage location, the source mask register to include a source mask, the source mask being allowed to i) include a plurality of unmasked elements, ii) include a plurality of masked elements, and iii) have an arrangement of the unmasked elements and the masked elements in which a masked element is included between two unmasked elements; and
an execution unit coupled with the decode unit, the execution unit, in response to the instruction, to store a result in the destination storage location, wherein when the source mask includes the plurality of unmasked elements and the masked element included between the two unmasked elements, the result is to include the plurality of unmasked elements from the source mask consolidated together,
wherein the instruction, which is to be decoded by the decode unit, is to include one or more bits that are operable to have either:
a first value to indicate that the unmasked elements from the source mask are to be consolidated together in a least significant portion of the result; and
a second value to indicate that the unmasked elements from the source mask are to be consolidated together in a most significant portion of the result.

26. The processor of claim 25, wherein the execution unit is to store the result in which the masked elements from the source mask are to be consolidated together in a position adjacent to the consolidated together unmasked elements.

* * * * *